United States Patent [19]
Westerlage et al.

[11] Patent Number: 5,970,481
[45] Date of Patent: *Oct. 19, 1999

[54] METHOD AND APPARATUS FOR DETERMINING TAX OF A VEHICLE

[75] Inventors: Kenneth R. Westerlage, Fort Worth; William C. Kennedy, III, Dallas; William L. Hoag, Farmers Branch, all of Tex.

[73] Assignee: HighwayMaster Communications, Inc., Dallas, Tex.

[*] Notice: This patent is subject to a terminal disclaimer.

[21] Appl. No.: 08/976,294

[22] Filed: Nov. 21, 1997

Related U.S. Application Data

[63] Continuation of application No. 08/437,404, May 9, 1995, Pat. No. 5,694,322.

[51] Int. Cl.⁶ .................................................... G06F 17/60
[52] U.S. Cl. ............................................ 705/417; 705/31
[58] Field of Search ............................... 235/29 R, 30 R, 235/33; 340/870.07; 705/30, 31, 34, 417

[56] References Cited

U.S. PATENT DOCUMENTS

| | | | |
|---|---|---|---|
| Re. 34,034 | 8/1992 | O'Sullivan | 379/59 |
| 3,518,674 | 6/1970 | Moorehead et al. | 343/112 |
| 3,680,121 | 7/1972 | Anderson et al. | 343/112 TC |
| 3,714,650 | 1/1973 | Fuller et al. | 343/6.5 LC |
| 3,757,290 | 9/1973 | Ross et al. | 340/23 |
| 3,789,409 | 1/1974 | Easton | 343/112 R |
| 3,848,254 | 11/1974 | Drebinger et al. | 343/112 R |
| 3,906,166 | 9/1975 | Cooper et al. | 179/41 A |
| 4,053,893 | 10/1977 | Boyer | 343/112 PT |
| 4,067,061 | 1/1978 | Juhasz | 364/900 |

(List continued on next page.)

FOREIGN PATENT DOCUMENTS

| | | |
|---|---|---|
| 3767589 | 2/1993 | Australia . |
| 0242099 | 10/1987 | European Pat. Off. . |
| 0290725 | 11/1988 | European Pat. Off. . |
| 0367935 | 5/1990 | European Pat. Off. . |
| 3516357 | 11/1986 | Germany . |
| 0161941 | 9/1984 | Japan . |
| 0175537 | 7/1988 | Japan . |
| 0219238 | 9/1988 | Japan . |
| 0226226 | 9/1989 | Japan . |
| 2193861 | 2/1988 | United Kingdom . |
| 2221113 | 1/1993 | United Kingdom . |
| 8904035 | 5/1989 | WIPO . |
| 8912835 | 12/1989 | WIPO . |

OTHER PUBLICATIONS

"TRIMPACK" Brochure, TrimbleNavigation, date unknown, 1 page.

Gary D. Ott, "Vehicle Location in Cellular Mobile Radio Systems," *IEEE*, vol. VT–26, No. 1, Feb., 1977, pp. 43–46.

James C. Reynolds, et al., "GPS–Based Vessel Position Monitoring and Display System," *IEEE*, 1990, pp. 601–607.

R. DeSadaba, "Personal Communications in the Intelligent Network," *British Telecommunications Engineering*, vol. 9, Aug., 1990, pp. 80–83.

(List continued on next page.)

*Primary Examiner*—Edward R. Cosimano
*Attorney, Agent, or Firm*—Baker & Botts, L.L.P.

[57] ABSTRACT

An apparatus for determining a tax for a vehicle (20) includes a positioning device (80) operable to determine a plurality of vehicle positions along a route traveled by the vehicle (20). A memory (102) stores geographic information defining a plurality of taxing regions through which the route of the vehicle (20) passes. An odometer (109) measures the distance traveled by the vehicle (20). A processor (100) is coupled to the positioning device (80), the memory (102), and the odometer (109). The processor (100) receives vehicle positions from the positioning device (80), geographic information from the memory (102), and optionally the measured distance from the odometer (109). The processor (100) determines the tax for the vehicle (20) in at least one taxing region through which the route of the vehicle (20) passes in response to the vehicle positions, the geographic information, and the measured distance.

41 Claims, 9 Drawing Sheets

U.S. PATENT DOCUMENTS

| | | | |
|---|---|---|---|
| 4,083,003 | 4/1978 | Haemming | 325/6 |
| 4,107,689 | 8/1978 | Jellinek | 343/23 |
| 4,152,693 | 5/1979 | Ashworth, Jr. | 340/24 |
| 4,177,466 | 12/1979 | Reagan | 343/112 TC |
| 4,222,052 | 9/1980 | Dunn | 343/112 R |
| 4,258,421 | 3/1981 | Juhasz et al. | 364/424 |
| 4,303,850 | 12/1981 | Juhasz et al. | 235/92 |
| 4,307,455 | 12/1981 | Juhasz et al. | 364/900 |
| 4,428,052 | 1/1984 | Robinson et al. | 364/436 |
| 4,428,057 | 1/1984 | Setliff et al. | 364/521 |
| 4,435,711 | 3/1984 | Ho et al. | 343/389 |
| 4,445,118 | 4/1984 | Taylor et al. | 343/357 |
| 4,547,778 | 10/1985 | Hinkle et al. | 343/456 |
| 4,590,569 | 5/1986 | Rogoff et al. | 364/452 |
| 4,644,351 | 2/1987 | Zabarsky et al. | 340/825.44 |
| 4,651,157 | 3/1987 | Gray et al. | 342/457 |
| 4,654,879 | 3/1987 | Goldman et al. | 455/33 |
| 4,660,037 | 4/1987 | Nakamura | 340/990 |
| 4,670,905 | 6/1987 | Sandvos et al. | 455/33 |
| 4,688,244 | 8/1987 | Hannon et al. | 379/58 |
| 4,700,374 | 10/1987 | Bini | 379/60 |
| 4,734,928 | 3/1988 | Weiner et al. | 379/59 |
| 4,737,978 | 4/1988 | Burke et al. | 379/60 |
| 4,740,792 | 4/1988 | Sagey et al. | 342/457 |
| 4,742,357 | 5/1988 | Rackley | 342/457 |
| 4,750,197 | 6/1988 | Denekamp et al. | 379/58 |
| 4,754,465 | 6/1988 | Trimble | 375/1 |
| 4,774,670 | 9/1988 | Palmeri | 364/446 |
| 4,775,999 | 10/1988 | Williams | 379/59 |
| 4,776,003 | 10/1988 | Harris | 379/91 |
| 4,788,637 | 11/1988 | Tamaru | 364/200 |
| 4,791,571 | 12/1988 | Takahashi et al. | 364/436 |
| 4,791,572 | 12/1988 | Green, III et al. | 364/449 |
| 4,796,189 | 1/1989 | Nakayama et al. | 364/449 |
| 4,797,948 | 1/1989 | Milliorn et al. | 455/54 |
| 4,799,162 | 1/1989 | Shinkawa et al. | 364/436 |
| 4,804,937 | 2/1989 | Barbiaux et al. | 340/52 F |
| 4,809,005 | 2/1989 | Counselman, III | 342/352 |
| 4,819,174 | 4/1989 | Furuno et al. | 364/444 |
| 4,833,477 | 5/1989 | Tendler | 342/389 |
| 4,833,701 | 5/1989 | Comroe et al. | 379/60 |
| 4,833,702 | 5/1989 | Shitara et al. | 379/60 |
| 4,843,575 | 6/1989 | Crane | 364/550 |
| 4,860,341 | 8/1989 | D'Avello et al. | 379/91 |
| 4,866,762 | 9/1989 | Pintar | 379/200 |
| 4,876,738 | 10/1989 | Selby | 466/33 |
| 4,884,208 | 11/1989 | Marinelli et al. | 364/460 |
| 4,891,650 | 1/1990 | Sheffer | 342/457 |
| 4,891,761 | 1/1990 | Gray et al. | 364/452 |
| 4,897,642 | 1/1990 | DiLullo et al. | 340/825.06 |
| 4,901,340 | 2/1990 | Parker et al. | 379/60 |
| 4,905,270 | 2/1990 | Ono | 379/58 |
| 4,907,290 | 3/1990 | Crompton | 455/56 |
| 4,908,629 | 3/1990 | Apsell et al. | 342/457 |
| 4,912,756 | 3/1990 | Hop | 379/60 |
| 4,914,686 | 4/1990 | Hagar, III et al. | 379/61 |
| 4,945,570 | 7/1990 | Gerson et al. | 381/110 |
| 4,953,198 | 8/1990 | Daly et al. | 379/61 |
| 4,963,865 | 10/1990 | Ichikawa et al. | 340/995 |
| 4,993,062 | 2/1991 | Dula et al. | 379/88 |
| 4,998,291 | 3/1991 | Marui et al. | 455/89 |
| 5,003,317 | 3/1991 | Gray et al. | 342/457 |
| 5,008,814 | 4/1991 | Mathur | 364/200 |
| 5,014,206 | 5/1991 | Scribner et al. | 364/449 |
| 5,019,963 | 5/1991 | Alderson et al. | 364/200 |
| 5,025,253 | 6/1991 | DiLullo et al. | 340/825.06 |
| 5,032,845 | 7/1991 | Velasco | 342/457 |
| 5,043,736 | 8/1991 | Darnell et al. | 342/357 |
| 5,045,861 | 9/1991 | Duffett-Smith | 342/457 |
| 5,046,082 | 9/1991 | Zicker et al. | 379/59 |
| 5,055,851 | 10/1991 | Sheffer | 342/457 |
| 5,058,201 | 10/1991 | Ishii et al. | 455/33 |
| 5,068,656 | 11/1991 | Sutherland | 340/989 |
| 5,090,050 | 2/1992 | Hefferman | 379/60 |
| 5,101,500 | 3/1992 | Marui | 455/33 |
| 5,119,102 | 6/1992 | Barnard | 342/357 |
| 5,121,126 | 6/1992 | Clagett | 342/419 |
| 5,121,325 | 6/1992 | DeJonge | 364/442 |
| 5,131,019 | 7/1992 | Sheffer et al. | 379/39 |
| 5,131,020 | 7/1992 | Liebesny et al. | 379/59 |
| 5,142,281 | 8/1992 | Park | 340/991 |
| 5,142,654 | 8/1992 | Sonberg et al. | 379/59 |
| 5,155,490 | 10/1992 | Spradley, Jr. et al. | 342/357 |
| 5,155,847 | 10/1992 | Kirouac et al. | 395/600 |
| 5,159,625 | 10/1992 | Zicker | 379/59 |
| 5,166,694 | 11/1992 | Russell et al. | 342/457 |
| 5,172,321 | 12/1992 | Ghaem et al. | 364/444 |
| 5,208,756 | 5/1993 | Song | 364/449 |
| 5,223,844 | 6/1993 | Mansell et al. | 342/357 |
| 5,225,842 | 7/1993 | Brown et al. | 342/357 |
| 5,235,633 | 8/1993 | Dennison et al. | 379/60 |
| 5,237,612 | 8/1993 | Raith | 380/23 |
| 5,243,529 | 9/1993 | Kashiwazaki | 364/449 |
| 5,247,564 | 9/1993 | Zicker | 379/40 |
| 5,252,982 | 10/1993 | Frei | 342/357 |
| 5,261,118 | 11/1993 | Vanderspool, II et al. | 455/51.2 |
| 5,270,936 | 12/1993 | Fukushima et al. | 364/444 |
| 5,276,729 | 1/1994 | Higuchi et al. | 379/58 |
| 5,293,163 | 3/1994 | Kakihara et al. | 340/995 |
| 5,297,191 | 3/1994 | Gerszberg | 379/59 |
| 5,297,192 | 3/1994 | Gerszberg | 379/59 |
| 5,299,132 | 3/1994 | Wortham | 364/460 |
| 5,311,194 | 5/1994 | Brown | 342/357 |
| 5,323,322 | 6/1994 | Mueller et al. | 364/449 |
| 5,359,528 | 10/1994 | Haendel et al. | 364/424.04 |
| 5,365,516 | 11/1994 | Jandrell | 370/18 |
| 5,392,458 | 2/1995 | Sasuta et al. | 455/54.1 |
| 5,396,540 | 3/1995 | Gooch | 379/59 |
| 5,729,458 | 3/1998 | Poppen | 705/417 |
| 5,787,373 | 7/1998 | Migues et al. | 701/33 |
| 5,864,831 | 1/1999 | Schuessler | 705/417 |

OTHER PUBLICATIONS

"GPS NAVSTAR Global Positioning System User's Overview—YEE–82–009D," *Navstar Global Positioning System Joint Program Office*, Mar., 1991, pp. 1–164.

"U.S. Coast Guard Differential GPS" Brochure, U.S. Department of Trnasportation, United States Coast Guard, May, 1993.

"GPS Facts & Figures" Brochure, U.S. Department of Transportation, United States Coast Guard, May, 1993.

D. H. Alsip, et al., "Implementation of the U.S. Coast Guard's Differential GPS Navigation Service," *U.S. Coast Guard Headquarters, Office of Navigation Safety and Waterway Services, Radionavigation Division*, Jun. 28, 1993, pp. 1–10.

"Motorola GPS Technical Reference Manual," Motorola, Oct., 1993, Manual Cover, Title Page, and pp. 4–109.

Don Burtis, "CDPD—A Bandwidth Optimization Technique for Cellular Telephones," *Computer Design's OEM Integration,* May, 1994, pp. 19–20.

"U.S. Coast Guard Bulletin Board System File 'FRP–DGPS,'" U.S. Coast Guard, Date Unknown, pp. 1–6.

Gene L. Schlechte, LCDR, "U.S. Coast Guard Bulletin Board System Document 'DESIGN.TXT'—Design Process for the United States Coast Guard's Differential GPS Navigation Service," U.S. Coast Guard, U.S. Coast Guard Omega, Navigation System Center, Date Unknown, pp. 1–21.

"Appendix B, The 1991 Radionavigation User Conference," Department of Transportation, Date Unknown, pp. 1–2.

Kirk Ladendorf, First in Flight—Using State–Of–The–Art Technology, Austin–Based Arrowsmith Technologies Establishes Itself As A Major Player in Nascent Technology–Supplier Market, Austin American–Statesman, Jan. 30, 1995, 3 pages.

| OLD VP NEW VP | DISTANCE IN EACH REGION (MILES) | | | TAX FOR EACH REGION ($) | | |
|---|---|---|---|---|---|---|
| | REGION 1 | REGION 2 | REGION 3 | REGION 1 | REGION 2 | REGION 3 |
| 1  A,B | 32 | | | .18 | | |
| 2  B,C | 45 | | | .21 | | |
| 3  C,D | | 65 | 5 | | .30 | .02 |
| 4  D,E | | | 35 | | | .25 |
| 5  E,F | | | 62 | | | .49 |
| 6  E,G | | | 68 | | | .50 |
| 7  F,G | | | 67 | | | .50 |
| 8  G,H | | | 45 | | | .32 |

METHOD AND APPARATUS FOR DETERMINING TAX OF A VEHICLE

CROSS REFERENCE TO RELATED APPLICATIONS

This is a continuation of U.S. application Ser. No. 08/437,404 filed May 9, 1995 by Kenneth R. Westerlage, William C. Kennedy III and William L. Hoag entitled "Method and Apparatus for Determining Tax of a Vehicle" now U.S. Pat. No. 5,694,322, issued on Dec. 2, 1997.

TECHNICAL FIELD OF THE INVENTION

This invention relates to determining tax of a vehicle, and more particularly to a system for determining tax of a vehicle using a positioning system.

BACKGROUND OF THE INVENTION

Mobile positioning technology has advanced substantially over the past decade. Many cars, trucks, airplanes, boats, and other vehicles are equipped with devices that provide convenient and reliable mobile positioning using either networks of satellite-based and land-based transceivers or an on-board positioning sensor, such as an inertial navigation system or a dead reckoning system.

Many users of mobile positioning systems, particularly those operating commercial vehicles, also require an accurate determination of tax assessed by one or more taxing regions through which the vehicles travel. Previously, tax determinations were based upon manual reporting and charting of vehicle positions, or recreation of the miles traveled in taxing regions after a trip. For example, one way to determine tax for a vehicle is to estimate the number of miles traveled by the vehicle based upon a corresponding distance taken along a preferred route on a map. This approach, however, may not be suitable for particular applications that require more accuracy in the determination of tax. Consequently, a need has arisen for an apparatus and method that accurately determines tax of a vehicle. Furthermore, operators of commercial vehicles may also require a way of reporting this tax to a remote location. For example, a cellular telephone in a vehicle offers a convenient communications link to report a determined tax.

SUMMARY OF THE INVENTION

In accordance with the present invention, the disadvantages and problems associated with previous techniques used to determine tax for a vehicle have been substantially reduced or eliminated. One aspect of the present invention provides a system for determining a tax of a vehicle using positioning technology.

According to an embodiment of the present invention, an apparatus on a vehicle for determining a tax for the vehicle includes a positioning device. The positioning device determines a plurality of vehicle positions along a route traveled by the vehicle. A memory stores geographic information defining a plurality of regions. A processor is coupled to the positioning device and the memory. The processor receives vehicle positions from the positioning device and geographic information from the memory. The processor determines the distance traveled by the vehicle in the regions in response to the vehicle positions and the geographic information.

According to another embodiment of the present invention, a method for determining a tax for a vehicle traveling through a plurality of taxing regions includes determining a plurality of vehicle positions. Each vehicle position is associated with a taxing region. The tax in each taxing region is determined in response to the vehicle positions associated with that taxing region.

Important technical features of the present invention include improving the accuracy of determining the distance traveled or tax for a vehicle passing through regions using a positioning system. The present invention provides determination of the tax on the vehicle or transmission of vehicle position information for determination at a remote location. Other important technical advantages include reporting tax information to a central location using a wireless communications network, such as the cellular telephone network. Another important technical advantage of the present invention includes consolidating tax determinations with the generation of billing information. Further technical advantages include determining tax of a vehicle based upon actual miles traveled by the vehicle. Yet another important technical feature of the present invention includes taking into consideration any deviation from a predetermined route when determining distance and tax. Another important technical advantage of the invention includes reducing the human error associated with determining distance traveled or tax. Other technical advantages are readily apparent to one skilled in the art from the following figures, description, and claims.

BRIEF DESCRIPTION OF THE DRAWINGS

For a more complete understanding of the present invention and for further features and advantages, reference is now made to the following description taken in conjunction with the accompanying drawings, wherein like reference numerals represent like parts, in which.

DETAILED DESCRIPTION OF THE INVENTION

Figure 1:
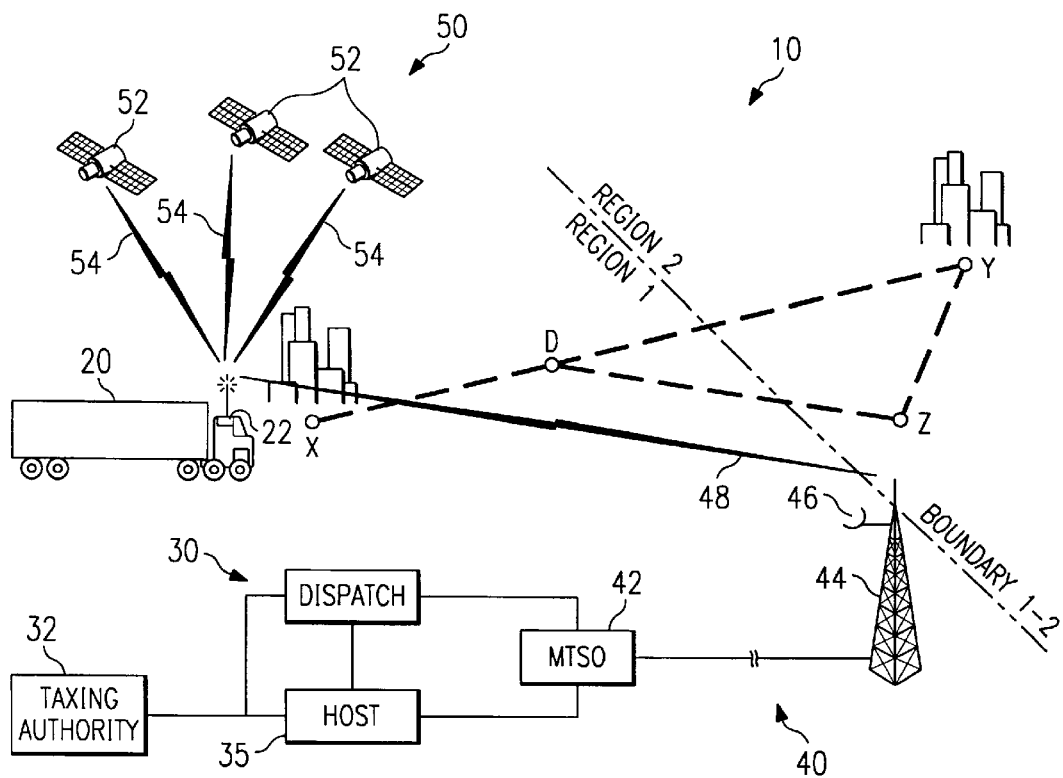
FIG. 1 illustrates a system for determining and reporting a tax of a vehicle.

FIG. 1 illustrates a system 10 for determining the tax of a vehicle 20 traveling from a point of origin X (located in a taxing region 1) to a destination Y (located in a taxing region 2) across a regional boundary 1-2. System 10 includes vehicle 20 equipped with a mobile unit 22, a dispatch 30, and a communications link 40. System 10 provides an accurate determination of tax for vehicle 20 traveling along route X-Y for each of taxing regions 1 and 2. System 10 may also be used to determine the distance vehicle 20 travels in different regions, without calculating any associated tax. Therefore, all discussions below that relate to determining a tax for vehicle 20 apply equally to determining the distance vehicle 20 travels in any geographic regions for reasons other than tax computation.

FIG. 1 shows mobile unit 22 on vehicle 20. The present invention contemplates mobile unit 22 being carried by all types of vehicles, including cars, trucks, airplanes, barges, boats, railcars, truck-trailers, or any other moveable object for which it is desirable to determine a tax based upon distance traveled within a taxing region. The taxing regions may be countries, regions, districts, states, counties, cities, particular roads or any other region that may charge a tax based on fuel consumption, road usage, or other activity relating to distance traveled or roads traveled along in the region. Each taxing region may have its own tax structure. Thus, the tax rate in region 1 may differ from the tax rate in region 2. Furthermore, each region may contain toll and non-toll road designations, which may also impact the determination of tax.

Mobile unit 22 comprises an odometer 109 (FIG. 9) operable to measure the distance traveled by vehicle 20. Odometer 109 can be the odometer originally included in vehicle 20. Alternatively, odometer 109 can be an odometer that is more integral to mobile unit 22 than vehicle 20. In one embodiment of the present invention, as will be discussed below in more detail, odometer 109 provides distance information that is used by mobile unit 22 to determine tax for vehicle 20. Odometer 109 is an important technical aspect of the present invention because many taxing authorities currently accept odometer readings as an accurate measurement of distance traveled by a vehicle. Alternatively, mobile unit 22 may use an approved mileage database, such as those provided by Rand-McNally and others, to determine distance traveled.

Using a positioning system 50, mobile unit 22 determines the position of vehicle 20. Specifically, mobile unit 22 comprises a mobile positioning receiver 80 (FIG. 9) operable to receive positioning information from positioning system 50. Mobile unit 22 receives positioning information over positioning information streams 54 from a plurality of satellites 52. Mobile unit 22 then determines its position fix using information from positioning information streams 54. The positioning information comprises accurate satellite positioning information transmitted by satellites 52 and pseudorange data represented by the time of arrival of positioning information streams 54 at mobile unit 22.

Positioning system 50 is illustrated as a satellite-based radio navigation system, such as the NAVSTAR global positioning system (GPS). The description uses the NAVSTAR GPS as a representative positioning system 50, but any land-based or satellite-based system may be used. For example, positioning system 50 may be a land-based LORAN-C, a space-based GLONASS, or any other appropriate positioning technology. As shown in FIG. 1, positioning system 50 comprises a plurality of satellites 52. In general, positioning system 50 comprises a plurality of space-based or land-based transmitters that emit positioning information.

Satellites 52 maintain accurate and synchronized time and simultaneously transmit positioning information that contains satellite specific and system information required by mobile unit 22 to determine the position fix of vehicle 20. The positioning information transmitted by satellites 52 may include high precision clock and ephemeris data for a particular satellite, low precision clock and ephemeris data for every satellite in a constellation ("almanac data"), health and configuration status for all satellites, user text messages, and other parameters describing operation of positioning system 50.

Positioning system 50 may also comprise additional satellites and one or more positioning receivers. The additional satellites may also communicate positioning information to mobile unit 22. In one embodiment, a positioning receiver 46 may be mounted on a receiver site 44, that is part of communications link 40, to implement differential GPS techniques. Positioning receiver 46 generates correction data that enables mobile unit 22 to more accurately determine the position fix of vehicle 20. Positioning receiver 46 transmits the correction data to mobile unit 22 over any suitable link, such as a vehicle information stream 48.

Alternatively, mobile unit 22 can generate positioning information itself using an on-board positioning sensor. For example, an inertial navigation system on vehicle 20 integrates accelerations imparted to vehicle 20 to determine current position. As another example, a dead reckoning system computes vehicle location based on compass orientation and distance traveled at that orientation. A dead reckoning system on vehicle 20 includes a direction finder, such as a compass, integrated with a distance sensor, such as odometer 109 or a tire rotation counter, to track the location of vehicle 20 and determine its current position.

In response to the positioning information from positioning system 50 or an on-board positioning sensor, mobile unit 22 determines the position fixes of vehicle 20. These position fixes may comprise standard geographical coordinates such as latitude and longitude.

The interval of time between determinations of a position fix may be configurable by either mobile unit 22 or dispatch 30. The determinations of a position fix may also be continuous. As discussed below, this interval of time dictates the accuracy of the determinations of distance traveled and tax of vehicle 20 in a taxing region.

The present invention contemplates that additional processing of information and determining of the distance traveled and tax in a taxing region may be performed on vehicle 20 by mobile unit 22 or at a remote location, such as dispatch 30 or a host 35. In one embodiment of the present invention, mobile unit 22 determines the distance traveled and tax of vehicle 20 based upon the position fixes, the distance measured by odometer 109, or other information that may be contained within mobile unit 22. After mobile unit 22 has made these determinations, this information can be transmitted to dispatch 30 or host 35 using communications link 40.

In another embodiment of the invention, dispatch 30 or host 35 performs the determination of distance traveled and tax after mobile unit 22 has transmitted vehicle information, including the position fixes and/or the distance measured by odometer 109, to the remote location. Mobile unit 22 thus includes a transceiver 94 (FIG. 9) through which mobile unit 22 transmits vehicle information to a remote location. In general, mobile unit 22 initiates transmission of information to dispatch 30 or host 35 based on some configurable condition, such as a predetermined reporting interval, a full memory buffer, a store and forward routine, or a minimum signal strength received from communications link 40.

Figure 9:
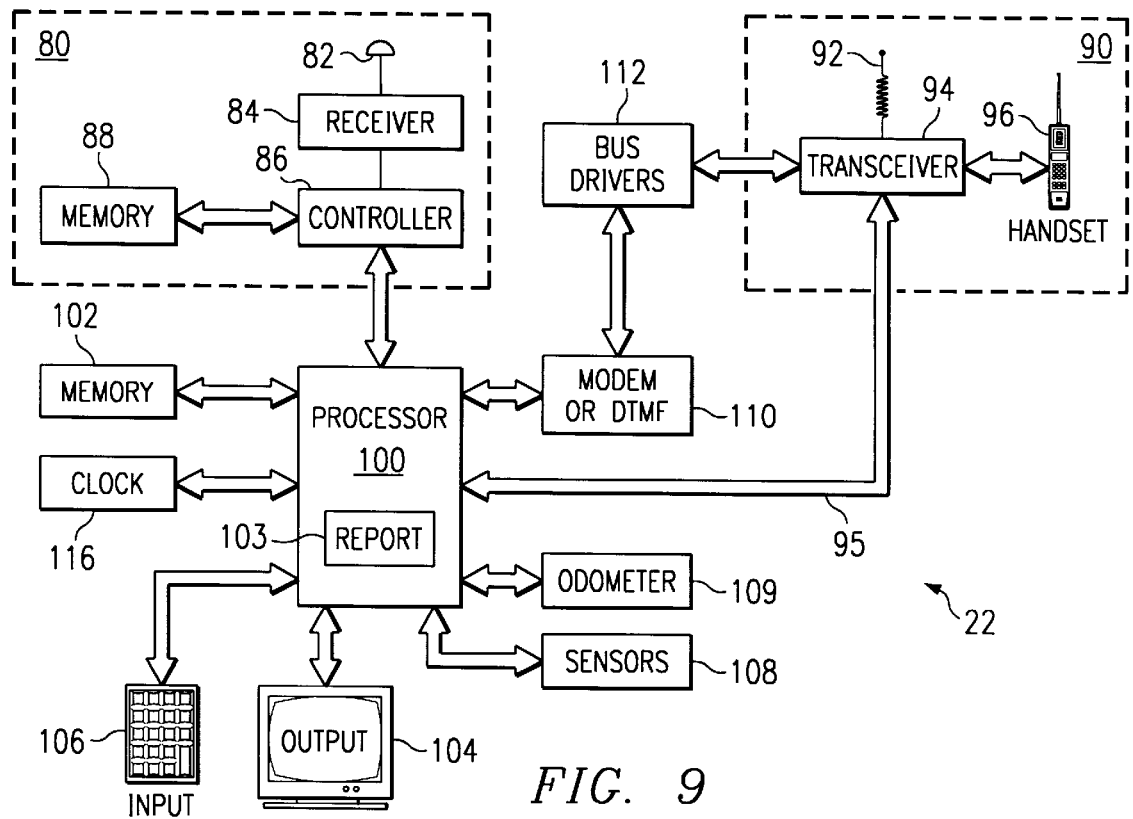
FIG. 9 is a schematic representation of a mobile unit.

Communications link 40 is coupled to mobile unit 22 on vehicle 20 and allows communication between mobile unit 22 and a remote location, such as dispatch 30 or host 35. In the embodiment shown in FIG. 1, communications link 40 comprises a cellular telephone network. More specifically, communications link 40 comprises at least one receiver site 44 operable to receive vehicle information from mobile unit 22 and a mobile telecommunications switching office (MTSO) 42 coupling receiver site 44 to dispatch 30. Mobile unit 22 determines position fixes and distances, and sends these fixes and distances along with other information to receiver site 44 over vehicle information stream 48. MTSO 42, coupled to receiver site 44, routes the vehicle information to dispatch 30 or host 35. Vehicle information may be encoded using traditional data encoders, such as a modem or a dual-tone multifrequency (DTMF) coder/decoder 110 (FIG. 9).

In other embodiments, communications link 40 may be one or a combination of dedicated telephone lines, switched telephone lines, microwave communications links, satellite-based communications links, specialized mobile radio (SMR), enhanced specialized mobile radio (ESMR), a personal communications service (PCS), a citizen's band (CB), a dedicated radio system, such as those used by police and fire fighters, or any other suitable communications link that allows mobile unit 22 to transmit data to or receive data from dispatch 30 or host 35. Communications link 40 may also be an SS7 backbone link or similar network for linking landline or cellular switches in a public switched telephone network (PSTN). Such a link allows components of the PSTN to share information for validation, roaming, billing, call routing, and other functions. Communications link 40 may also include intelligence to route information generated at mobile unit 22, dispatch 30, or host 35 to multiple selected sites.

Furthermore, vehicle information stream 48 may be the control channel, paging channel, part of a seized voice or data channel, or overhead message stream currently implemented in cellular telephone technology. Presently, the control channel provides paging of incoming calls, hand-off instructions, and other features of the cellular telephone network, but may be modified by one skilled in the art to include transmission of vehicle information. Vehicle information stream 48 may also be implemented using any other analog or digital communications link between mobile unit 22 and receiver site 44, whether or not the communications link requires seizing of a voice or data channel, and whether or not a data encoder is used.

As mobile unit 22 moves from one location to another, vehicle information will be transmitted to different receiver sites 44. Receiver sites 44 are operable to emit signals to mobile unit 22. Mobile unit 22 may then alternatively tune between several signals emitted by receiver sites 44 to determine the strongest signal, usually relating to the nearest receiver site 44. Mobile unit 22 establishes communication with that receiver site 44.

Additionally, there are several developing technologies that may provide a convenient implementation of vehicle information stream 48. For example, cellular digital packet data (CDPD) technology allows integration of data and voice using the existing cellular telephone infrastructure. In a CDPD system, digital packets of data and analog voice segments share the same channel. Other developments in digital cellular communications, such as code division multiple access (CDMA) and time division multiple access (TDMA), allow digital data and digital voice signals to be interspersed on a communications channel. These technologies integrate digital data transmission in a communications link 40, and therefore provide a convenient implementation scheme for vehicle information stream 48.

Mobile unit 22 may send vehicle information to receiver site 44 in one large packet or in several smaller packets interspersed with other data used for mobile communications. For example, the vehicle information may be packaged in existing, but unused, bytes of the overhead message stream or in a dedicated protocol. One possible implementation would place vehicle information in the extended protocol described in the EIA/TIA-533 mobile communications standard, which provides for bidirectional communication between mobile unit 22 and receiver site 44.

Because dispatch 30 and host 35 are coupled to communications link 40, dispatch 30 and host 35 can communicate with mobile unit 22. Host 35 performs the management and control functions for one or more fleets of trucks. Therefore, system 10 may include many hosts 35 associated with trucking companies, delivery services, or other organizations with vehicles 20 equipped with mobile units 22. Host 35 may receive vehicle information directly from communications link 40. If distance and tax for vehicles 20 have not been determined, host 35 may make these determinations. Alternatively, dispatch 30 may receive and process vehicle information from communications link 40 and then route such information to host 35. Furthermore, host 35 can transmit information to mobile unit 22 either directly using communications link 40 or indirectly through dispatch 30. For example, host 35 may generate destination information for vehicle 20 and transmit this information over a communications link to dispatch 30. Such destination information may include one or more destinations, appointment information such as a corresponding appointment time for each destination specified, routing information, information regarding tasks to be performed at each destination specified, average travel time to each destination, rush hour and traffic information, and weather information. Dispatch 30 collects destination information from several hosts 35 and transmits this information to vehicles 20. Alternatively, host 35 may transmit destination information to vehicles 20 over communications link 40. In essence, some of the functions performed by dispatch 30 may be distributed among several hosts 35. For clarity, the remainder of this description will focus primarily on the functionality of dispatch 30, but it is understood that host 35 can perform some or all of the functions performed by dispatch 30.

Dispatch 30 receives the vehicle information generated by mobile unit 22 for vehicle 20 using communications link 40. In particular, dispatch 30 contains a modem or DTMF coder/decoder 120 (FIG. 10) that receives vehicle information from MTSO 42. Dispatch 30 may comprise an input-output device 126 (FIG. 10) operable to present visually or audibly the vehicle information at dispatch 30 once the information has been received by dispatch 30. For example, input-output device 126 displays vehicle information on a map showing that vehicle 20 is traveling along route X-Y between point of origin X and destination Y.

Dispatch 30 may perform additional processing of the information received from mobile unit 22 over communications link 40. As discussed above, the present invention contemplates that in some embodiments mobile unit 22 does not perform all the determinations necessary for distance traveled and tax of vehicle 20 in a taxing region. Thus, in some cases, in response to vehicle information, dispatch 30 determines the distance traveled by and associated tax for vehicle 20 in each taxing region through which vehicle 20 travels. As will be explained below in more detail, dispatch 30 may determine distance traveled and tax for vehicle 20 using one of several methods. In addition, dispatch 30 may generate a report comprising distance traveled by vehicle 20 in each taxing region and the corresponding tax.

Dispatch 30 transfers vehicle distance, tax information, and actual payment for taxes to taxing authority 32. Taxing authority 32 can generate a tax bill for vehicle 20 or actually receive money and generate a receipt for taxes paid. Transfer of money directly to taxing authority 32 can be accomplished by physically printing and mailing a check, or through any suitable electronic funds transfer technology, such as the electronic data interchange (EDI). Automatic payment of taxes to taxing authority 32 streamlines the tax collection process, reduces potential errors and tardiness in tax computation and payment, and decreases the number of personnel required to compute and collect taxes. When vehicle 20 has already paid a portion of the taxes at the time of fueling or at other times, then the total taxes due taxing authority 32 can be reduced by the amount of the prepaid taxes. Prepaid tax information can be generated at vehicle 20 either automatically or by operator intervention.

Dispatch 30 also generates information that may be sent to vehicle 20 using communications link 40. For example, one function of dispatch 30 may be to generate destination information, as described above, for vehicle 20. Dispatch 30 can also configure the interval of time between position fix determinations by mobile unit 22. Generally, dispatch 30 may transmit to mobile unit 22 any information that facilitates the control or monitoring of vehicle 20.

In the alternative, vehicle information may be loaded into dispatch 30 using any suitable device, such as a keypad, a direct connection, or any suitable removable storage media. Furthermore, vehicle information may be communicated to dispatch 30 using a local wireless link. In some cases, distance traveled and tax in a taxing region do not need to be determined immediately after vehicle 20 has reached its destination. Billing charges may be collected later. In order to avoid unnecessary telecommunications charges associated with using telecommunications link 40, vehicle information may be stored on vehicle 20 and later downloaded to dispatch 30 when vehicle 20 has returned to dispatch 30.

System 10 supports reporting of vehicle distances logged in predefined regions. When the predefined regions correspond to boundaries of taxing authorities, system 10 also provides a more accurate determination of vehicle taxes than currently available systems. It may provide these determinations near instantaneously or "on the fly." These determinations may consider the specifics of each trip, such as the route traveled by vehicle 20, actual mileage traveled within a taxing region, actual time and mileage at which vehicle 20 traveled from one taxing region into another, and points through which vehicle 20 passes along a particular route. In some applications, low frequency and low accuracy determinations are sufficient. Other applications, however, require greater accuracy and higher frequency determination in near real time. For example, vehicle 20 may carry packages for delivery to different stops along route X-Y. In some cases, it is desirable to bill the party receiving a package for delivery charges at the moment when the package is delivered. The present invention provides determination of the tax attributable to that delivery when the package is received. Because these determinations may be performed at fixed time intervals, on-demand, or as a result of a predetermined reporting event, billing may accurately be apportioned between deliveries. Furthermore, the present invention allows for adjustments in billing to reflect changes in tax that may be caused by additional distances traveled, such as in the case of road closures.

System 10 supports the remote sending of vehicle information to dispatch 30 from vehicle 20. In most cases, billing statements are generated at a central location, such as dispatch 30. The billing statements may include delivery charges. Delivery charges, in turn, take into account tax charges. Thus, system 10 provides that tax determinations may be consolidated with the generation of billing information. In this way, total taxes for vehicle 20 can be apportioned to particular deliveries, which results in more accurate billing.

System 10 permits determination of tax for vehicle 20 based upon actual mileage driven by vehicle 20 in taxing regions. For example, referring to FIG. 1, at the moment vehicle 20 leaves origin X to travel to destination Y, the tax for vehicle 20 would be based upon the distance traveled in region 1 along route X-Y and the distance traveled in region 2 along route X-Y. Suppose, however, that a severe storm forces vehicle 20 to detour from route X-Y at point D. Vehicle 20 must then travel through point Z in order to reach destination Y. Because the present invention determines tax based upon actual vehicle positions and distances traveled, as will be discussed in more detail below, system 20 would be able to provide an accurate tax determination even if vehicle 20 is forced to deviate from route X-Y.

System 10 can also adjust the tax computation based on the specific route traveled by vehicle 20. For example, a taxing region may contain both toll and non-toll roads. If the toll road is privately maintained and vehicle 20 pays the toll at the time of use, then the total distance traveled in the taxing region for purposes of tax calculation may be reduced by the distance traveled on the toll road. There may also be other adjustments to computed tax based on route, such as flat tolls for using a road or bridge. Using system 10, taxing authority 32 could easily and inexpensively account for and collect flat tolls or usage fees for roads and bridges traveled by vehicle 20. A computed tax may also depend on the route taken, whereas some roads carry a different flat tax or rate from others. System 10 can support this and other computations of tax based on the route of vehicle 20.

Furthermore, vehicle information and tax for vehicle 20 are automatically determined. Any human error in inputting the vehicle information or determining the tax is substantially reduced or eliminated. For example, like the present invention, some previous methods to determine tax use an odometer to measure the distance traveled by the vehicle. These methods, however, require that the operator of a vehicle record the mileage displayed on the odometer when the vehicle travels from one taxing region into another. This mileage is then used as the basis for calculating tax for the vehicle. If the operator forgets to record the mileage shown on the odometer, however, the determination of tax would be inaccurate. Because the present invention is able to determine when vehicle 20 has traveled from one taxing region into another and to automatically record the mileage at that moment, the error associated with previous methods is eliminated. Also, since the operator of vehicle 20 is not distracted from the primary duty of driving vehicle 20, the risk of vehicle 20 being involved in an accident is reduced.

In system 10, dispatch 30 allows monitoring of at least one vehicle 20 equipped with mobile unit 22. A large company may operate dispatch 30 to monitor a plurality of vehicles 20 equipped with mobile units 22. Smaller companies with more limited resources could pool together to either jointly operate dispatch 30 or employ an independent firm to operate dispatch 30. It should be understood that the present invention contemplates any number and arrangement of dispatches 30 to monitor one or more fleets of vehicles 20.

Figure 2:
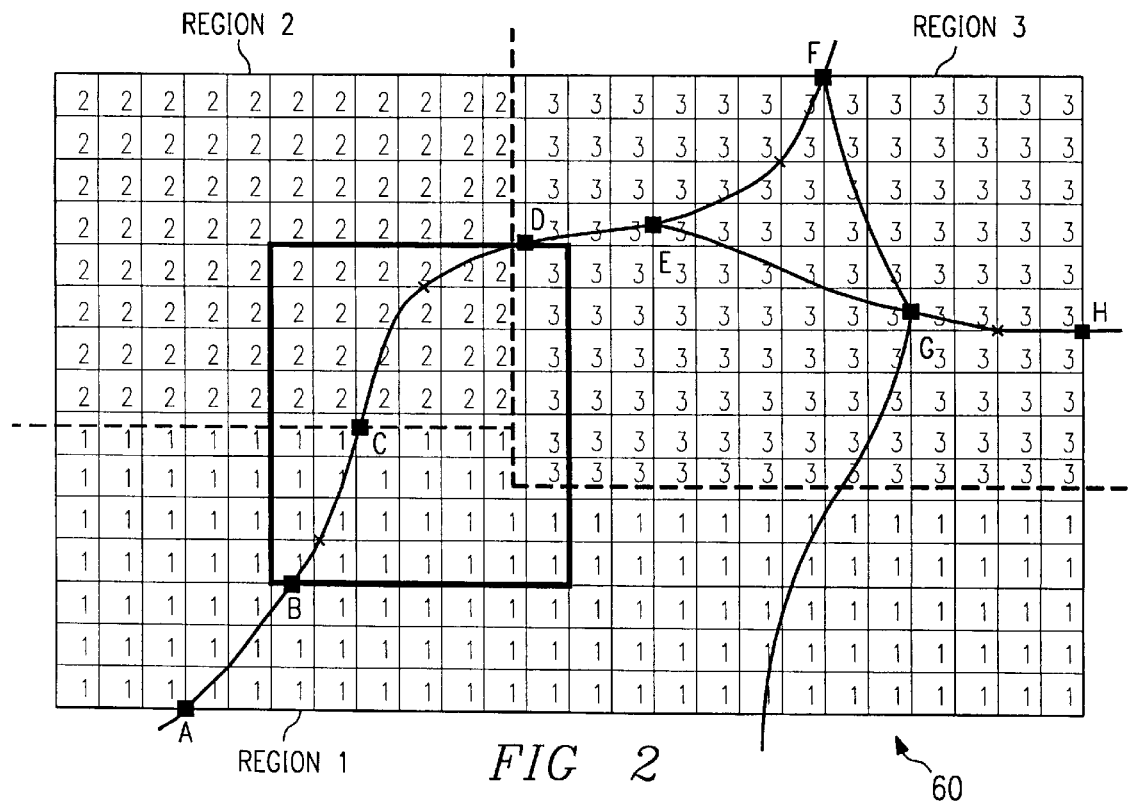
FIG. 2 illustrates a grid overlaying a map generated in a first embodiment of the invention.
Figure 3:
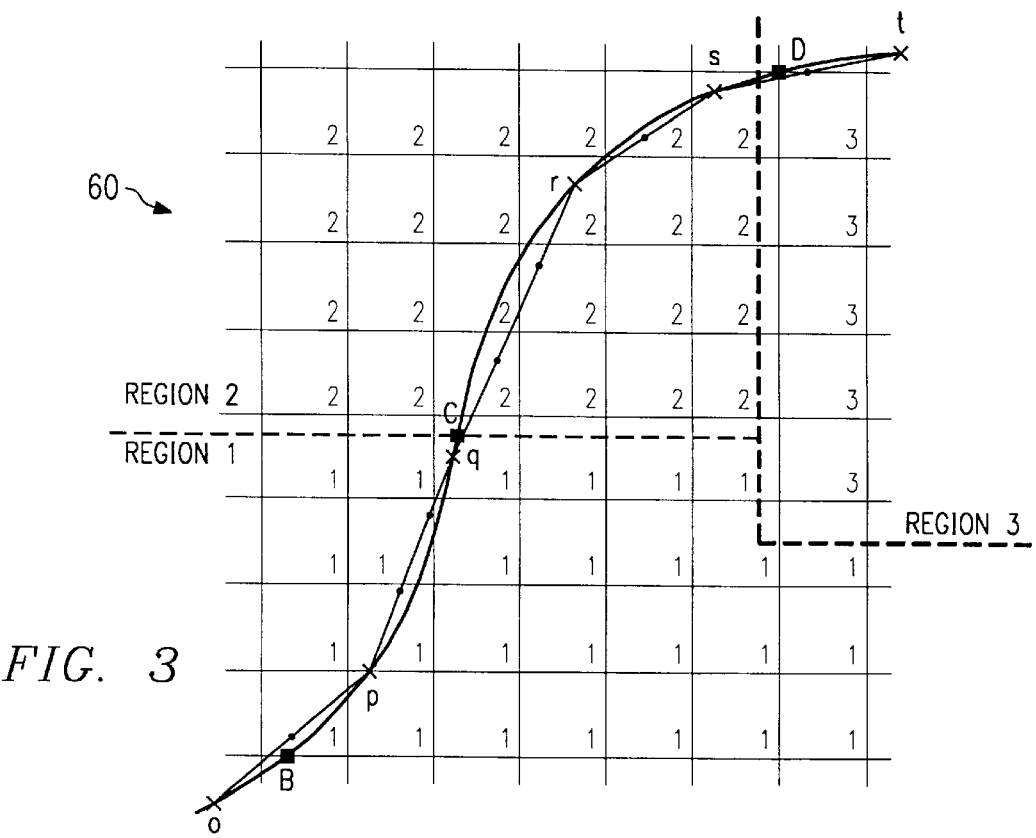
FIG. 3 illustrates an enlarged portion of the grid shown in FIG. 2.
Figure 4:
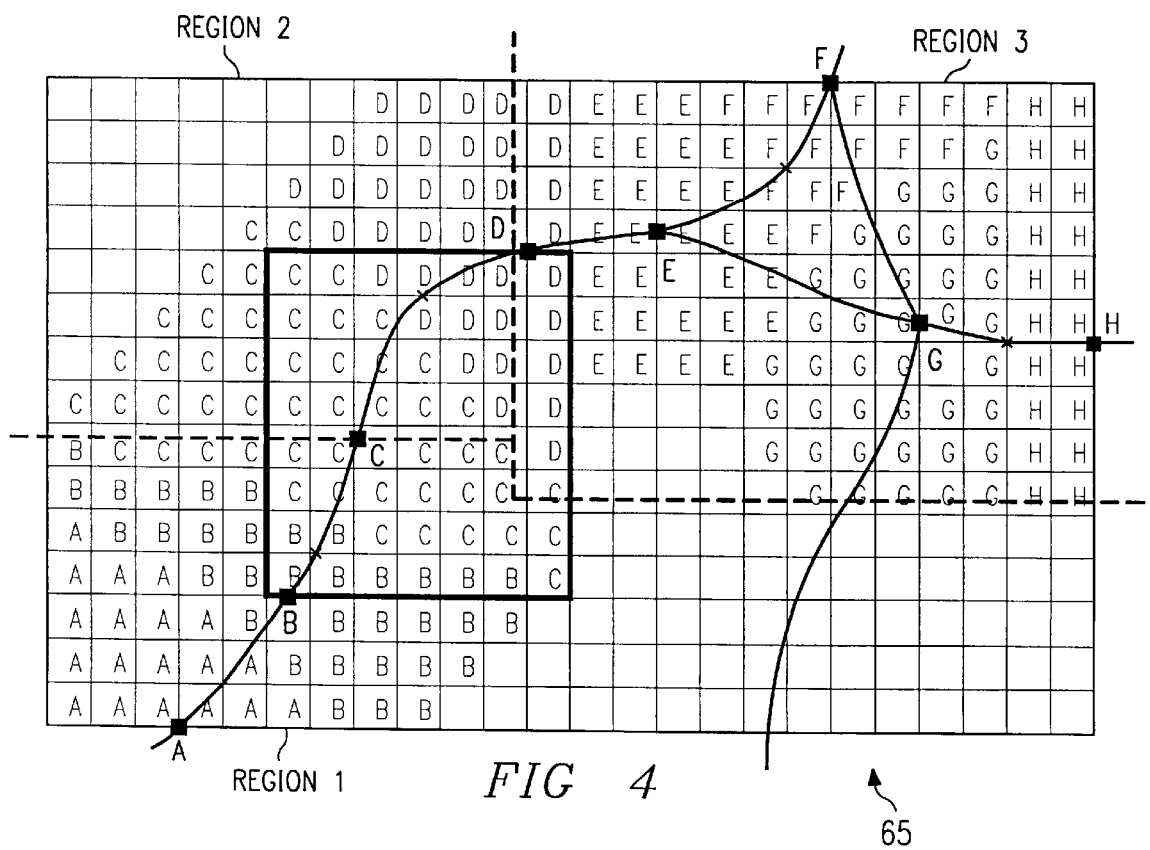
FIG. 4 illustrates a grid overlaying a map generated in a second embodiment of the invention.
Figures 5, 6:
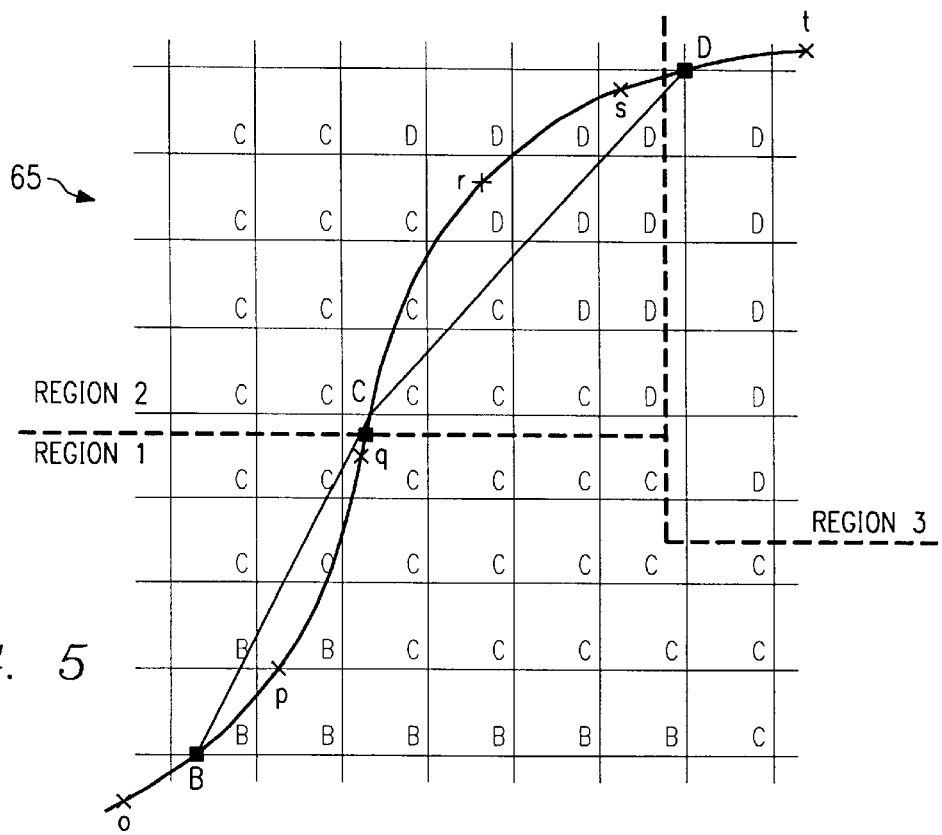
FIG. 5 illustrates an enlarged portion of the grid shown in FIG. 4.
FIG. 6 illustrates a table generated in the second embodiment of the invention.
Figure 7:
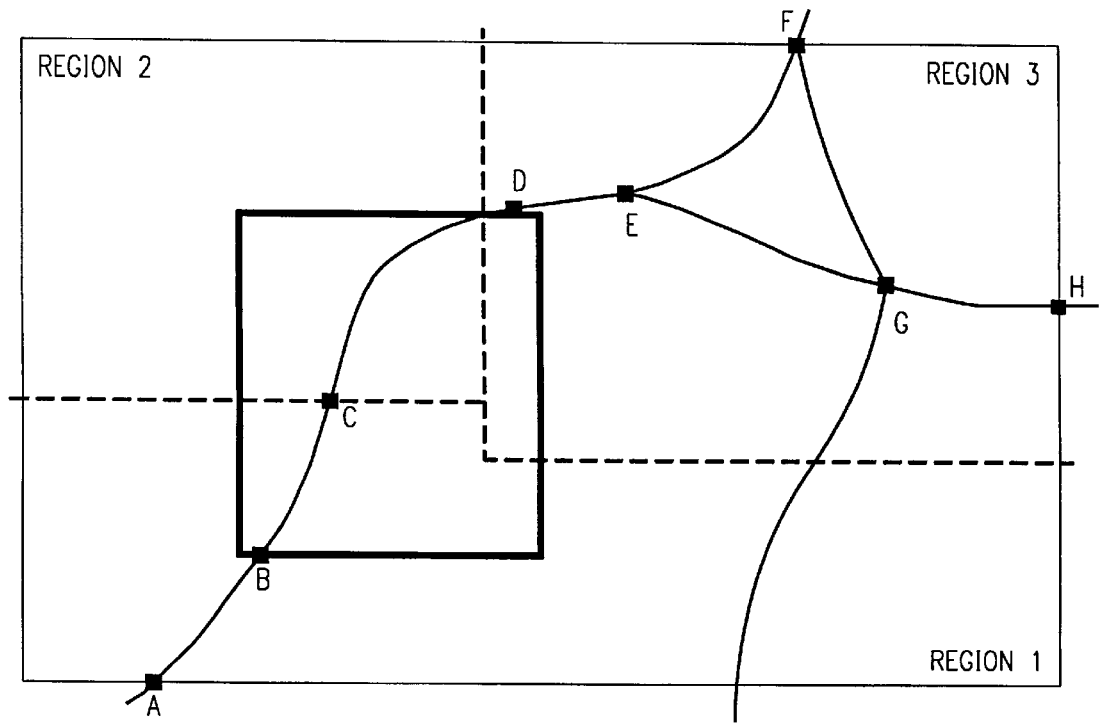
FIG. 7 illustrates a map showing the operation of a third embodiment of the invention.
Figure 8:
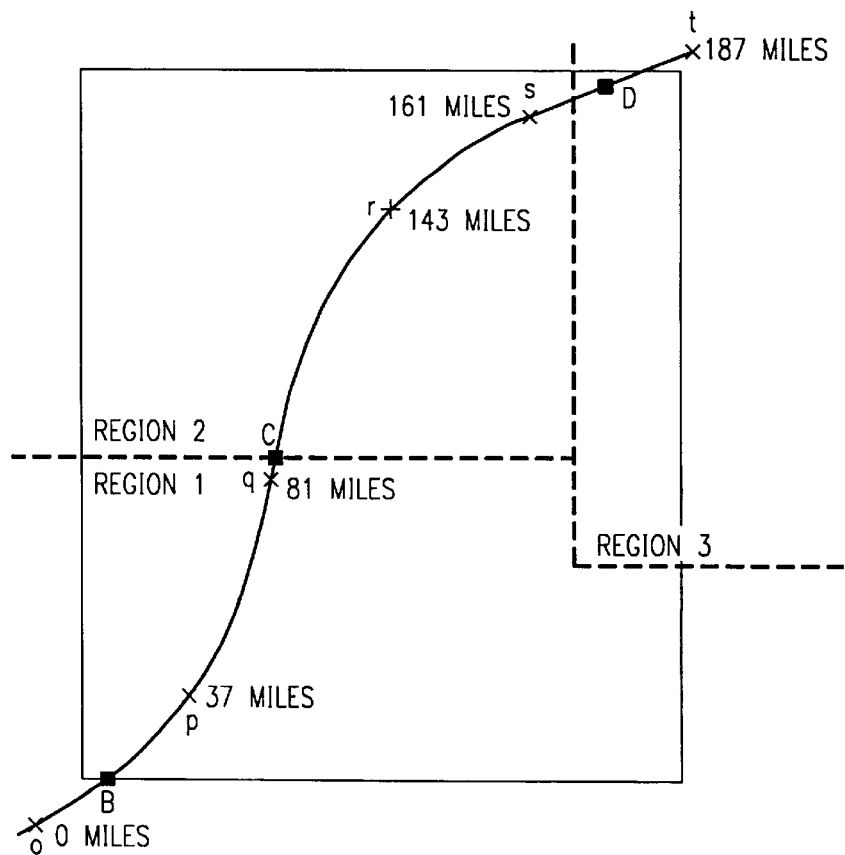
FIG. 8 illustrates an enlarged portion of the map shown in FIG. 7.

FIGS. 2–8 disclose three embodiments of the present invention. In particular, FIGS. 2 and 3 illustrate a region grid 60 that is integral to a first method for determining the tax of vehicle 20. FIGS. 4–6 illustrate a vehicle position grid 65 and an associated table 70 that are integral to a second method for determining the tax of vehicle 20. FIGS. 7 and 8 illustrate a map showing the operation of a third method for determining the tax of vehicle 20.

Generally, a method for determining a tax for vehicle 20 traveling through a plurality of taxing regions includes determining a plurality of vehicle positions, associating each vehicle position with a taxing region, and determining the tax in each taxing region in response to the vehicle positions associated with the taxing region. The present invention contemplates three specific methods for executing the general method.

In the first method, which is associated with FIGS. 2 and 3, mobile unit 22 computes a plurality of position fixes using either positioning system 50 or an on-board positioning sensor. These position fixes are, actual locations over which vehicle 20 has traveled. As discussed above, position fixes may be in the form of standard geographical coordinates such as latitude and longitude. Mobile unit 22 may then generate vehicle positions between the position fixes by interpolation. Interpolation is more suited for computations at a remote location, such as dispatch 30, host 35, or taxing authority 32, where the granularity of the location data may be sacrificed to reduce the amount of data transmitted from mobile unit 22. Mobile unit 22 can also perform position fixes at a more frequent, near real-time, interval. This provides an accurate determination of region boundaries without the need for interpolation. The decision to interpolate and the number of interpolated points depends on the frequency of position fixes and the size of the cells in region grid 60.

In a second method, which is associated with FIGS. 4–6, mobile unit 22 computes a plurality of position fixes using either positioning system 50 or an on-board positioning sensor. Depending on the frequency of the position fixes and the cell size of grid 65, a number of vehicle positions may be generated by interpolating between position fixes. Mobile unit 22 then relates position fixes to predetermined vehicle positions. Predetermined vehicle positions are defined as significant geographical points, such as cities, towns, boundaries between taxing regions, or intersections of major highways. Predetermined vehicle positions and distance between predetermined vehicle positions may be determined from any mileage database, such as those, provided by Rand-McNally, ALK or others. In the preferred embodiment, the taxing authorities accept tax calculations based on these mileage databases Vehicle position grid 65, illustrated in FIGS. 4 and 5, contains individual cells associated with predetermined vehicle positions. Using the predetermined vehicle positions of vehicle position grid 65, mobile unit 22 reconstructs the route traveled by vehicle 20. Table 70, illustrated in FIG. 6, contains taxing information and distances between the predetermined vehicle positions set forth in vehicle position grid 65. Using table 70, mobile unit 22 determines a distance and tax for vehicle 20.

In a third method, which is associated with FIGS. 7 and 8, mobile unit 22 also computes a plurality of position fixes using either positioning system 50 or an on-board positioning sensor. Like the first method, these position fixes constitute actual locations over which vehicle 20 has traveled, and may be in the form of latitude-longitude coordinates. Unlike the two previous methods, this method does not incorporate a grid. Rather, mobile unit 22 utilizes position fixes to determine the current taxing region and odometer 109 to determine distance traveled by vehicle 20 in the taxing region.

The first, second, and third methods will be discussed in more detail below in conjunction with a description of FIGS. 2–8. In the three embodiments of the invention illustrated in FIGS. 2–8, the steps may be performed either wholly on vehicle 20 by mobile unit 22 or partly on vehicle 20 and partly at a remote location, such as dispatch 30, host 35, or taxing authority 32. As will be explained in more detail below, if the steps are performed on vehicle 20, a processor 100 (FIG. 9) that is part of mobile unit 22 makes the determinations. Similarly, if the steps are performed at dispatch 30, a central controller 122 (FIG. 10) makes the determinations. To better distinguish the three methods and for clarity, the following explanation of the methods disclosed in FIGS. 2–8 assumes that all steps are performed on vehicle 20. It must be understood, however, that one or more steps in any of the three methods may also be performed at a remote location such as dispatch 30.

FIG. 2 illustrates region grid 60 overlaying a map generated in one embodiment of the invention. The map shows three taxing regions defined as region 1, region 2, and region 3. The regions may be representative of countries, regions, states, counties, districts, cities, or any other region for which it is desirable to determine a tax based on distance traveled in the region. Each taxing region may have a different tax structure and/or rate. For example, region 1 may assess tax at a first rate, whereas region 2 may assess tax at a second rate. Several routes throughout the regions are defined in part by points A, B, C, D, E, F, G, and H. These points may represent cities, boundaries between regions, or any other landmark or geographic location that may define a route. For example, points A, B, E, F, G, and H represent cities within a particular region. Points C and D represent points on the border between two regions.

Region grid 60 disclosed in FIG. 2 comprises a plurality of cells. Each cell is associated with the taxing region (either region 1, 2 or 3) within which it is located. All cells are approximately equal in size. Preferably, a cell would be located wholly in one region or another. In some cases, however, such as when the boundaries between regions are not straight lines, a cell may be partially located in a plurality of regions. In this latter case, the cell may be associated with the region in which most of the cell is located. Software may be used to fill in the data associated with each cell of region grid 60. This data may include the region associated with the cell, geographical coordinates defining the cell, or routes traveling over the area represented by the cell.

The area represented by the cells is configurable., That is, the cells may represent one square mile parcels, five square mile parcels, ten square mile parcels, or other predefined areas. The cells may be squares, rectangles, circles, polygons, or any other geometric construct that facilitates the definition of a region. The area represented by the cells determines the accuracy of the tax determination. For instance, suppose that a cell is partially located in several regions. The cell is associated with a single taxing region. If the area represented by the cell is one square mile, the error generated by associating a single region with the cell would be less than if the area represented by the cell is ten square miles.

FIG. 3 illustrates an enlarged portion of region grid 60 disclosed in FIG. 2. FIG. 3 shows route B-C-D over which vehicle 20 travels. As vehicle 20 travels along route B-C-D, mobile unit 22 obtains position fixes for vehicle 20 at points o, p, q, r, s, and t.

If interpolation is performed, the step of determining a plurality of vehicle positions from a set of position fixes is executed as follows. Mobile unit 22 on vehicle 20 establishes a plurality of position fixes o, p, q, r, s, and t using position system 50 or an on-board positioning sensor. Processor 100, which is part of mobile unit 22, determines a route traveled by vehicle 20 in response to the position fixes o, p, q, r, s, and t. In particular, the route of vehicle 20 is represented by lines o-p, p-q, q-r, r-s, and s-t connecting position fixes o, p, q, r, s, and t. Processor 100 then divides each line into a plurality of segments. The end point of each segment, shown as the dots on lines o-p, p-q, q-r, r-s, and s-t, defines a vehicle position along the route of vehicle 20. In this manner, mobile unit 22 can generate several vehicle positions for each position fix provided by positioning system 50 or an on-board positioning sensor.

The length of each segment may be proportioned to the size of the cells in region grid 60. As discussed above, if frequent position fixes are taken, there may be no need to interpolate between the position fixes to generate additional vehicle positions. With or without interpolation, the spacing between position fixes (or vehicle positions if interpolation is used) should be coincident with the cell size, so that a transition from one cell to an adjacent cell will be detected. It should be understood that any reference to vehicle positions includes interpolated vehicle positions, position fixes, or both.

Next, the step of associating each vehicle position with a taxing region is executed as follows. Processor 100 references a map overlaid with a plurality of cells, shown generally by grid 60 in FIG. 2 and in detail in FIG. 3. The map and associated grid may be generated by processor 100, but is normally produced by another computer or person and loaded into mobile unit 22 for use by processor 100. Each cell is associated with a taxing region 1, 2, or 3. One or more vehicle positions may be contained within a single cell. Processor 100 identifies the cell containing the vehicle position. Processor 100 then associates the vehicle position with the taxing region associated with the cell.

Next, the step of determining the tax is performed as follows. Processor 100 determines the distance traveled in each taxing region in response to the vehicle positions associated with that taxing region. Processor 100 can determine distance by reading odometer 109 (FIG. 9) at each position fix. Another way in which processor 100 can determine distance is by summing up the number of segments within a taxing region and multiplying that figure by the distance represented by each segment. For example, if vehicle 20 has traveled 24 segments in a taxing region and each segment represents 10 miles, then processor 100 calculates that vehicle 20 has traveled 240 (24×10) miles in the region.

Another way in which processor 100 can determine distance for vehicle 20 is by calculating the distance of each segment using standard geometrical formulae and then summing up these distances. For example, if vehicle 20 has traveled segments of 10 miles, 12 miles, and 9 miles in a taxing region, then processor 100 calculates that vehicle 20 has traveled 31 (10+12+9) miles within that region. A calculation based on straight line segments may not accurately represent curvature of the road. Therefore, distance can be adjusted by multiplying the sum of the straight line segments by a curvature factor (i.e. 1.1), which represents an estimate of the increase in distance due to road curvature. Different curvature factors for different roads may be used by mobile unit 22. Other curve fitting techniques or spline constructions may also be used to more accurately determine distance traveled on the roads. Processor 100 then determines a tax in the region in response to the computed distance traveled by vehicle 20 in the region. Mobile unit 22 may then transmit the determined distance and tax to a remote location, such as dispatch 30.

An alternative embodiment of the invention is disclosed in FIGS. 4–6. Whereas the first method disclosed in FIGS. 2 and 3 focuses upon taxing regions, the second method disclosed in FIGS. 4–6 focuses upon predetermined vehicle positions which correspond to distinct geographic landmarks or monuments, such as cities, intersections between routes, or intersections of routes with regional boundaries. FIG. 4 illustrates vehicle position grid 65 overlaying a map. Similar to FIG. 2, the map in FIG. 4 is divided into taxing regions 1, 2, and 3. Several routes throughout the regions are defined in part by points A, B, C, D, E, F G and H. As discussed above, these points may represent cities, boundaries between regions, or any other landmark or geographic location that may define a route. These points are associated with predetermined vehicle positions. Vehicle position grid 65 comprises a plurality of cells, which can be approximately equal in size. Normally, vehicle position grid 65 is based on an approved mileage database, such as those provided by Rand-McNally, ALK, and others.

Unlike region grid 60, the cells in vehicle position grid 65 are associated with the predetermined vehicle positions corresponding to points along the route traveled by vehicle 20. That is, the cells contain A, B, C, D, E, F, G, or H associated with the predetermined vehicle position to which it is most closely located. In some instances, however, one part of the cell may be more closely located to one predetermined vehicle position whereas another part of the cell may be more closely located to another predetermined vehicle position. In such a case, the cell is associated with the predetermined vehicle position to which most of the cell is more closely located. Software may be used to fill in the data contained within each cell. For example, vehicle position grid 65 may be completed by a program using a spiraling or an expanding radius technique originating at each predetermined vehicle position to fill the cells. Some outlying cells are not associated with any predetermined vehicle positions.

The number of predetermined vehicle positions contained in vehicle position grid 65 dictates the accuracy of the distance and tax determinations for this method. That is, if more predetermined vehicle positions are used, accuracy will be increased. For example, suppose vehicle 20 travels from Dallas to Los Angeles. Further suppose that vehicle position grid 65 only has Dallas, Los Angeles, and Phoenix as predetermined vehicle positions. As will be discussed below, for any two predetermined vehicle positions of vehicle position grid 65, there will be corresponding distances and taxes. Vehicle 20, however, may travel to Los Angeles from Dallas via Phoenix along at least two different routes, one of which is longer than the other. One route takes vehicle 20 through Amarillo, whereas another route takes vehicle 20 through El Paso. The route through Amarillo is longer. The determination of distance and tax for vehicle 20 would be inaccurate if the corresponding distances and taxes are based upon the route through El Paso, but vehicle 20 actually travels through Amarillo. If Amarillo and El Paso are also included as predetermined vehicle positions in vehicle position grid 65, however, there would be separate corresponding taxes and distances for each of the two routes described above. Thus, the accuracy of the determination would be increased.

A complete trip of vehicle 20 from Dallas to Los Angeles may include small distances at the beginning and end of the trip that can be added to the total distance traveled. For example, if the trip begins in Fort Worth (approximately thirty-five miles from Dallas), but the first predetermined vehicle position is Dallas, then mobile unit 22 should add the additional thirty-five miles traveled between Fort Worth and Dallas to the calculation. Similarly, if Los Angeles is the last predetermined vehicle position on the trip, but vehicle 20 continues a short way to its destination in Pasadena, then this distance should be added to the calculation. An additional calculation may also be needed when vehicle 20 travels into outlying cells of vehicle position grid 65 that are not associated with any predetermined vehicle positions. In this situation, mobile unit 22 can adopt a hybrid technique that uses the other methods described to compute distance and tax determinations when vehicle 20 travels into outlying cells.

FIG. 5 illustrates an enlarged portion of vehicle position grid 65 disclosed in FIG. 4. FIG. 5 illustrates route B-C-D traveled by vehicle 20 in taxing regions 1 and 2. In operation, mobile unit 22 takes position fixes o, p, q, r, s, and t for vehicle 20 using positioning system 50 or an on-board positioning sensor. The position fixes o, p, q, r, s, and t are then related to predetermined vehicle positions, which establishes the route B-C-D traveled by vehicle 20. The determination for tax in this method can use the actual distance between points B, C, and D or highway mileage derived from a mileage database. As discussed below, the operator of vehicle 20 may record the actual mileage between the predetermined vehicle positions.

The general steps for this second method using vehicle position grid 65 of FIG. 4 are the same as for the first method using region grid 60 of FIG. 2. That is, a method for determining a tax for vehicle 20 traveling through a plurality of taxing regions includes determining a plurality of vehicle positions, associating each vehicle position with a taxing region, and determining the tax in each taxing region in response to the vehicle positions associated with the taxing region.

The step of determining a plurality of vehicle positions is performed as follows. Mobile unit 22 establishes a plurality of position fixes using positioning system 50 or an on-board positioning sensor. Depending on the frequency of position fixes and the cell size of grid 65, mobile unit may also generate vehicle positions between position fixes by interpolation. A map is generated with a plurality of cells, shown generally by vehicle position grid 65 in FIG. 4. Taxing regions are defined on the map. Each cell is associated with a predetermined vehicle position. Processor 100 next associates each position fix with a cell in vehicle position grid 65, which identifies a predetermined vehicle position. Using the predetermined vehicle positions associated with the position fixes, processor 100 reconstructs the route traveled by vehicle 20 through vehicle positions B, C, and D.

In this particular method, the step of determining the tax is executed as follows. Processor loo utilizes a database containing the predetermined vehicle positions, the corresponding distance in each taxing region between vehicle positions, and the tax associated with each taxing region between predetermined vehicle positions. Processor 100 determines the distance traveled by vehicle 20 in each taxing region by referencing the database for the distance between each predetermined vehicle position along the route traveled by vehicle 20. Processor 100 then determines the tax in each region by referencing the database for the tax associated with each taxing region between the predetermined vehicle positions along the route traveled by vehicle 20. A more detailed explanation of this method is set forth in the description for FIG. 13.

FIG. 6 illustrates table 70 generated in the embodiment of the invention disclosed by FIGS. 4 and 5. Table 70 may be referenced in order to determine distance traveled and tax of vehicle 20 between any two predetermined vehicle positions that are associated with the cells of vehicle position grid 65.

Table 70 includes a plurality of sections. The first section, which comprises column 71, contains a first predetermined vehicle position and a second predetermined vehicle position. In particular, the predetermined vehicle positions in column 71 correspond to the predetermined vehicle positions associated with the cells of vehicle position grid 65. These pairs of predetermined vehicle positions define one leg of the route traveled by vehicle 20.

A distance section 72 contains the distance in each taxing region traveled by vehicle 20 between first and second predetermined vehicle positions. Distance section 72 may be further separated into region distance columns 74, 75, and 76. Each of these columns contains the distance traveled by vehicle 20 between the first and second vehicle positions within a particular taxing region. Specifically, region distance column 74 contains miles traveled in region 1, region distance column 75 contains miles traveled in region 2, and region distance column 76 contains miles traveled in region 3. Each leg of the route, specified in column 71, can include one or more entries in region columns 74, 75, and 76. For example, route C-D includes sixty-five miles in taxing region 2 and five miles in taxing region 3.

A tax section 73 contains a tax for taxing regions between first and second predetermined vehicle positions. Tax section 73 may be further divided into region tax columns 77, 78, and 79. Each of these columns contains a tax for vehicle 20 between first and second predetermined vehicle positions for a particular taxing region. Region tax column 77 contains the dollar amount of tax for region 1, region tax column 78 contains the dollar amount of tax for region 2, and region tax column 79 contains the dollar amount of tax for region 3. These taxes may be based on a tax rate per miles traveled, a flat tax for a predefined range of miles traveled, fees for traveling over particular roads or bridges, or any other tax computation based on the route of vehicle 20.

Processor 100 references table 70 after processor 100 has determined that vehicle 20 has traveled between two predetermined vehicle positions. For example, referring to FIG. 5, after processor 100 has determined that vehicle 20 has passed through point D along route B-C-D, processor 100 references line 3 in table 70 which corresponds to route C-D. By referencing distance section 72, processor 100 determines that vehicle 20 traveled 65 miles within region 2 between points C and D. By referencing tax section 73, processor 100 determines that vehicle 20 incurred $0.30 of tax in region 2 and $0.02 of tax in region 3 while traveling along route C-D. This information may then be displayed on output device 104 (FIG. 9) of mobile unit 22 or input/output device 126 (FIG. 10) at dispatch 30.

Another embodiment of the invention is disclosed in FIGS. 7 and 8. Unlike the first method disclosed in FIGS. 2 and 3 and the second method disclosed in FIGS. 4–6, the third method disclosed in FIGS. 7 and 8 does not use a grid pattern. Rather, this method uses odometer 109 in conjunction with a geographical database to determine distance traveled by and tax for vehicle 20. In particular, FIG. 7 illustrates a map showing the operation of this embodiment of the invention. The map is divided into taxing regions 1, 2, and 3. A plurality of routes through the regions are defined in part by points A, B, C, D, E, F, G, and H. Again, these points may represent any landmark or geographic location that may define a route, such as a city, a boundary between regions, an intersection of a route with a boundary, or an intersection of two or more routes.

The geographical database contains information defining a plurality of taxing regions. This geographic information may include coordinates defining regional boundaries, the intersections of routes with regional boundaries, or any other information that allows a processor to determine that vehicle 20 has traveled from one region into another. For example, the geographical database may include a pair of latitude-longitude coordinates which represent the endpoints of a line corresponding to the boundary between taxing region 1 and taxing region 2. The geographical database can define-a set of polygons or other geometrical constructs that define the taxing region. The geographical database may also comprise line segments, splines, or curves that define the boundary between taxing regions. Using any definition of taxing region boundaries or area, processor 100 can determine that vehicle 20 has moved from one region into an adjacent region.

FIG. 8 illustrates an enlarged portion of the map shown in FIG. 7. FIG. 8 illustrates route B-C-D traveled by vehicle 20 in taxing regions 1 and 2. Mobile unit 22 takes position fixes o, p, q, r, s, and t for vehicle 20 using either positioning system 50 or an on-board positioning sensor. The position fixes o, p, q, r, s, and t are then related to a taxing region. Mobile unit 22 records the reading of odometer 109 at each of the position fixes o, p, q, r, s and t, as shown in the mileage readings in FIG. 8. The determination of tax in this third method is based upon the actual distance measured by odometer 109 between position fixes.

The general steps for this third method using the map of FIGS. 7 and 8 are similar as for the first two methods disclosed in FIGS. 2–6. Specifically, as stated above, a method for determining a tax for vehicle 20 traveling through a plurality of taxing regions includes determining a plurality of vehicle positions, associating each vehicle position with a taxing region, and determining the tax in each taxing region in response to the vehicle positions associated with the taxing region.

For the third method, the step of determining a plurality of vehicle positions is executed as follows. Mobile unit 22 establishes a plurality of position fixes using positioning system 50 or an on-board positioning sensor. Each position fix may be in the form of standard geographical coordinates such as latitude and longitude.

The step of associating each vehicle position with a taxing region is performed as follows. Mobile unit 22 accesses a database that contains information defining a plurality of taxing regions and may comprise coordinates defining regional boundaries, intersections of routes with regional boundaries, or any other information that allows a processor to determine that vehicle 20 has traveled from one taxing region into another. Mobile unit 22 then associates each position fix with a taxing region in response to the geographical information contained in the database.

In this method the step of determining the tax for vehicle 20 is executed as follows. Mobile unit 22 measures the distance traveled by vehicle 20 between position fixes using odometer 109. As stated before, odometer 109 may be the odometer included in vehicle 20 or a separate odometer. Processor 100 then determines the distance traveled in each taxing region in response to the position fixes associated with that taxing region and the distance measured by odometer 109. The present invention contemplates that processor 100 may determine distance using one of two alternative methods at this step.

Processor 100 determines the amount of mileage recorded by odometer 109 since the last position fix and adds this amount to the distance already recorded for the region. For example, assume vehicle 20 has traveled twenty miles since the last position fix and entered a new taxing region at the second mile. Normally, processor 100 credits twenty miles to the old taxing region. To further refine the distance determination, processor 100 may use the position fix, information contained in the geographical database, and standard geometric equations to calculate approximately at what mileage since the last odometer reading vehicle 20 passed into the new taxing region. Processor 100 then credits a proportionate amount of mileage to the old taxing region and the new taxing region. Processor 100 then adds two miles to the distance traveled in the old region and eighteen miles to the distance traveled in the new region. Processor 100 then determines a tax for each taxing region in response to the distance traveled by vehicle 20 in that taxing region. A more detailed explanation of this third method is set forth in the description for FIG. 14.

FIG. 9 is a schematic representation of mobile unit 22. Mobile unit 22 includes mobile positioning receiver 80, mobile communications device 90, odometer 109, and other associated hardware and software, described below. Mobile positioning receiver 80 includes antenna 82, receiver 84, controller 86, and memory 88. In operation, mobile positioning receiver 80 receives positioning information from satellites 52 over positioning information streams 54 at antenna 82. Receiver 84 processes the positioning information to extract ephemeris, almanac, and clock correction data. Controller 86 receives the positioning information and computes a position fix. These determinations performed by controller 86 may use data stored in memory 88.

Mobile communications device 90 includes an antenna 92, transceiver 94, and a handset 96. In operation, mobile communications device 90 transmits vehicle information over vehicle information stream 48. The vehicle information may be received by dispatch 30 using elements of communications link 40, such as receiver site 44 associated with the cellular telephone network. Mobile communications device 90 can also receive data or calls transmitted to mobile unit 22 from a remote site, such as dispatch 30. Handset 96 provides traditional voice or data communications using mobile communications device 90.

Odometer 109 may be the odometer originally included with vehicle 20 or a second odometer that is more integral to mobile unit 22. Odometer 109 measures the actual distance traveled by vehicle 20. An important technical advantage of the present invention is provided by odometer 109 because many taxing authorities currently accept odometer readings as an accurate measurement of distance traveled by a vehicle. The accuracy of the tax determination will depend in part upon the accuracy of odometer 109.

Processor 100 manages the communicating, calculating, locating, and reporting features of mobile unit 22. In operation, processor 100 receives a position fix from controller 86 and a measured distance from odometer 109. Processor 100 then generates vehicle information, which may be generated in the form of a report 103. Determination of tax for vehicle 20 may be performed by processor 100, by central controller 122 at dispatch 30, or by a combination of processor 100 and central controller 122. In addition, processor 100 may generate a report comprising distance traveled by vehicle 20 in each region and the corresponding tax. Processor 100 routes the vehicle information or determined tax through link 95 or over any other appropriate path, such as through modem or dual tone multifrequency (DTMF)

coder/decoder 110 and bus drivers 112 to transceiver 94 of mobile communications device 90. Transceiver 94 then transmits the vehicle information or determined tax to dispatch 30 over communications link 40.

Coupled to processor 100 is memory 102 which may contain grids, such as region grid 60 or vehicle position grid 65, programs, maps, geographical databases, and other information required by processor 100 to perform its functions. Memory 102 may be random access memory (RAM), read-only memory (ROM), magnetic media, CD-ROM, removable memory devices, or any other device that allows storage or retrieval of data. Processor 100 and controller 86, as well as memory 102 and memory 88, may be separate or integral components of mobile unit 22. Mobile unit 22 contemplates any arrangement, processing capability, or task assignment between mobile positioning receiver 80, mobile communications device 90, and processor 100.

Vehicle information or determined tax may be sent to output device 104 to generate a map displaying vehicle 20 and the position fixes. Output device 104 can produce audible information, such as the announcement of a determined tax and distance traveled in a taxing region to the operator of vehicle 20.

Processor 100 is also coupled to input device 106, which may be a keypad or touch screen, as well as voice recognition software and hardware that can accept audible commands and information. Furthermore, both output device 104 and input device 106 may include fixed or removable storage media, such as magnetic computer discs, CD-ROM, or other suitable media to both receive output from and provide input to processor 100 or memory 102. The operator of vehicle 20 may input information into mobile unit 22 when vehicle 20 reaches a significant vehicle position, such as the boundary of a taxing region. Using input device 106, the operator logs information about the vehicle position based upon the position fix for vehicle 20 determined by mobile positioning receiver 80, actual time and mileage at which vehicle 20 travels from one taxing region into another, the actual route over which vehicle 20 travels, points through which vehicle 20 passes, and any other item for which it is desirable to have a record. The operator may manually or orally log all of this information into mobile unit 22, or the operator may cooperate with processor 100 to log the information. For instance, using input device 106, the operator may manually or orally record the moment when vehicle 20 reaches a certain geographic mark, after which processor 100 automatically logs the other items. The geographic mark may be one of the predetermined vehicle positions I discussed above in regard to vehicle position grid 65. This predetermined vehicle position may be stored in memory 102 along with the other information. The actual highway mileage between predetermined vehicle positions, that may be included in the stored information, can later be retrieved and used to update existing databases, such as table 70. Thus, on future trips mobile unit 22 or dispatch 30 can then use the information to more accurately determine distance traveled by vehicle 20 between predetermined vehicle positions and the corresponding tax. This information allows the geographic database to be updated "on the fly" as vehicle 20 generates more accurate geographic information.

Processor 100 generates vehicle information for transmission to dispatch 30 using mobile communications device 90. The vehicle information may include position fixes, vehicle positions, actual time and mileage at which vehicle 20 travels from one taxing region into another, the actual route over which vehicle 20 travels, points through which vehicle 20 passes, the determined distance and tax in a taxing region, the time of reporting, or information input by the vehicle operator, as well as any other information collected by processor 100 from various sensors 108. For example, sensors 108 may include various engine sensors, truck trailer sensors, security monitors, or other devices generating information on the status or condition of mobile unit 22, vehicle 20, or its operator. In particular, sensors 108 can be on-board positioning sensors to determine position fixes, alone or in combination with positioning system 50.

Figure 10:
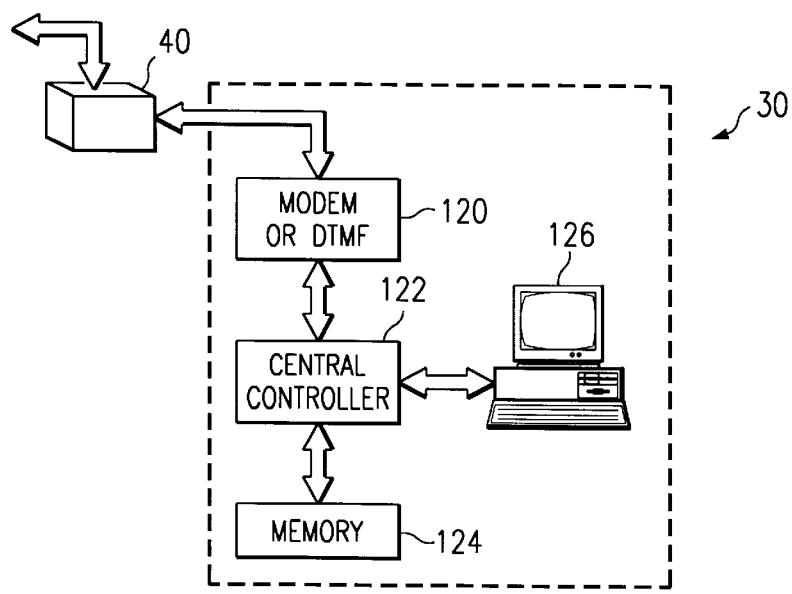
FIG. 10 is a schematic representation of a dispatch.

The generation and transmission of this vehicle information may be based on a determination that vehicle 20 has passed a significant geographic point, an elapsed time, a predetermined time, movement of mobile unit 22, sensor readings, or any other piece of information that may necessitate reporting to a remote location. The vehicle information is sent from processor 100 through modem or DTMF coder/decoder 110 to bus drivers 112, and then to transceiver 94 for transmission over antenna 92 to a remote location, such as dispatch 30 (FIG. 10). Vehicle information may also be sent directly to transceiver 94 over link 95. Mobile unit 22 may also include a clock 116 coupled to processor 100 that may be used to synchronize the position fix received from controller 86 with vehicle information transmitted to transceiver 94.

Components of mobile unit 22 shown in FIG. 9 may be packaged into one or more housings. Mobile unit 22 may be mounted to vehicle 20 or an object to be tracked. Mobile unit 22 may also be packaged as a portable, hand-held device that provides personal timing, locating, communicating, and reporting functions.

FIG. 10 is a schematic representation of dispatch 30. Dispatch 30 includes modem or DTMF coder/decoder 120, central controller 122, a memory 124, input/output device 126, and other associated hardware and software. Memory 124 may be RAM, ROM, CD-ROM, removable memory devices, or any other device that allows storage or retrieval of data. Input/output device 126 includes any variety of output devices, such as a display, a speaker to provide audible information, removable storage media, or any other appropriate output device. Input/output device 126 may also include a variety of input devices, such as a keyboard, mouse, touch screen, removable storage media, or any other appropriate input device.

As discussed above, determination of distance and tax for vehicle 20 may be performed wholly on vehicle 20 by mobile unit 22 or partly on vehicle 20 by mobile unit 22 and partly at dispatch 30 by central controller 122. If determinations of-distance and tax are performed by mobile unit 22, dispatch 30 receives the determined distance, tax, or both for vehicle 20 in a taxing region from communications link 40.

If determinations of distance and tax are not performed by mobile unit 22, then dispatch 30 receives vehicle information for one or more vehicles 20 carrying mobile units 22. In particular, vehicle information is received at central controller 122 through modem or DTMF coder/decoder 120 from communications link 40. Alternatively, reception of vehicle information at dispatch 30 may not require a data encoder. The vehicle information may include position fixes, vehicle positions, corresponding times for each vehicle position, measured distance, actual time and mileage at which vehicle 20 travels from one taxing region into another, route of vehicle 20, operating parameters, and other information. Central controller 122 processes the vehicle information to determine the distance traveled by vehicle 20 in each taxing region and the corresponding tax. The vehicle positions, the determined tax, and the determined distance for each taxing region may be stored in memory 124 and displayed on input/output device 126. Memory 124 may also contain grids, such as region grid 60 or vehicle position grid 65, programs, maps, geographical databases, and other information required by central controller 122 to perform its functions.

Central controller 122 may also receive other information from mobile unit 22 and process this information to determine expected time of arrival, locate, track, dispatch, and communicate with mobile unit 22. For example, central controller 122 can maintain a database in memory 124 of all mobile units 22 with their current expected times of arrival, location, status, and relevant sensor readings. This database can also be used to initiate communication with mobile unit 22. Furthermore, central controller 122 may perform a call delivery function that routes incoming calls to mobile, unit 22 through communications link 40.

Figure 11:
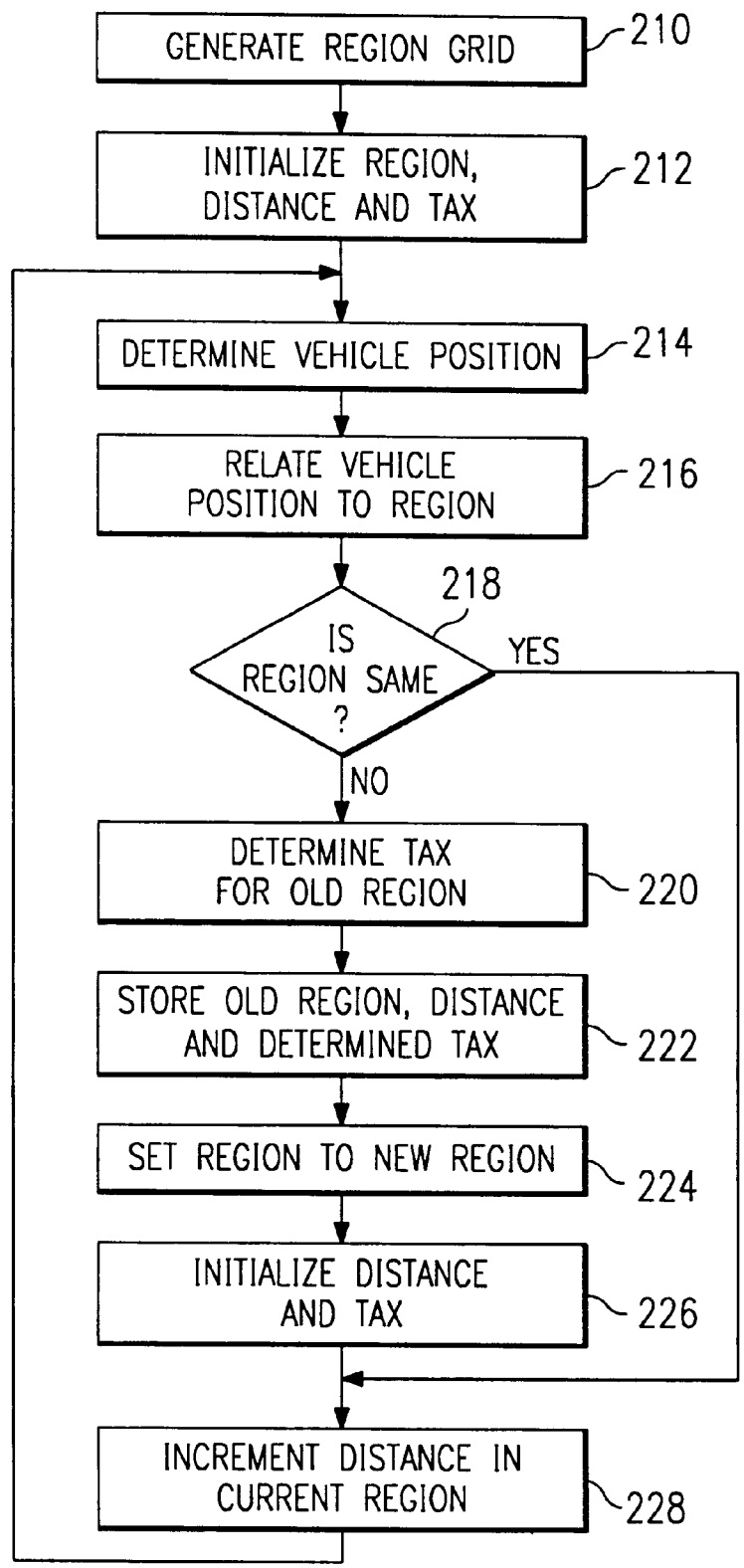
FIG. 11 is a flow chart of the first method for determining tax of a vehicle, using the grid shown in FIGS. 2 and 3.

FIG. 11 is a flow chart of a method for determining tax using region grid 60 shown in FIGS. 2 and 3. The following explanation of the method illustrated in FIG. 11 assumes that all steps are performed on vehicle 20.

Initially, processor 100 of mobile unit 22, some other on-board or remote device, or a person generates region grid 60 (at 210), comprising a plurality of cells, each cell associated with a taxing region. The taxing regions may represent countries, states, counties, districts, cities, or any other region for which it is desirable to determine a tax. Processor 100 next initializes the region, distance traveled by vehicle 20 in the region, and tax for the region (at 212).

Receiver 84 of mobile positioning receiver 80 processes positioning information received from satellites 52, and controller 86 determines a position fix. Alternatively, an on-board positioning sensor establishes a position fix. Processor 100 receives the position fix, from either mobile positioning receiver 80 or the on-board positioning sensor, defining a leg of the route traveled by vehicle 20. Processor 100 determines an initial vehicle position representing the beginning of the leg defined by the position fixes (at 214). Based upon the information contained in region grid 60 and other information that may be contained within memory 102, processor 100 relates the vehicle position to a region (at 216).

Processor 100 determines (at 218) whether the region is the same as before. If the region is not the same as before, processor 100 determines the tax for the old region (at 220). Processor 100 stores (at 222) the old region, distance traveled in that region, and the determined tax for the region within memory 102. Processor 100 sets the region to the new region (at 224). Processor 100 initializes the distance and tax for the new region (at 226). Processor 100 increments the distance in the current region (at 228). The step of incrementing the distance may be performed using vehicle positions or by reading mileage from odometer 109. If the region is the same, processor 100 skips to the step of incrementing distance in the current region (at 228). Mobile unit 22 then returns to the step of determining a vehicle position (at 214).

Figure 12:
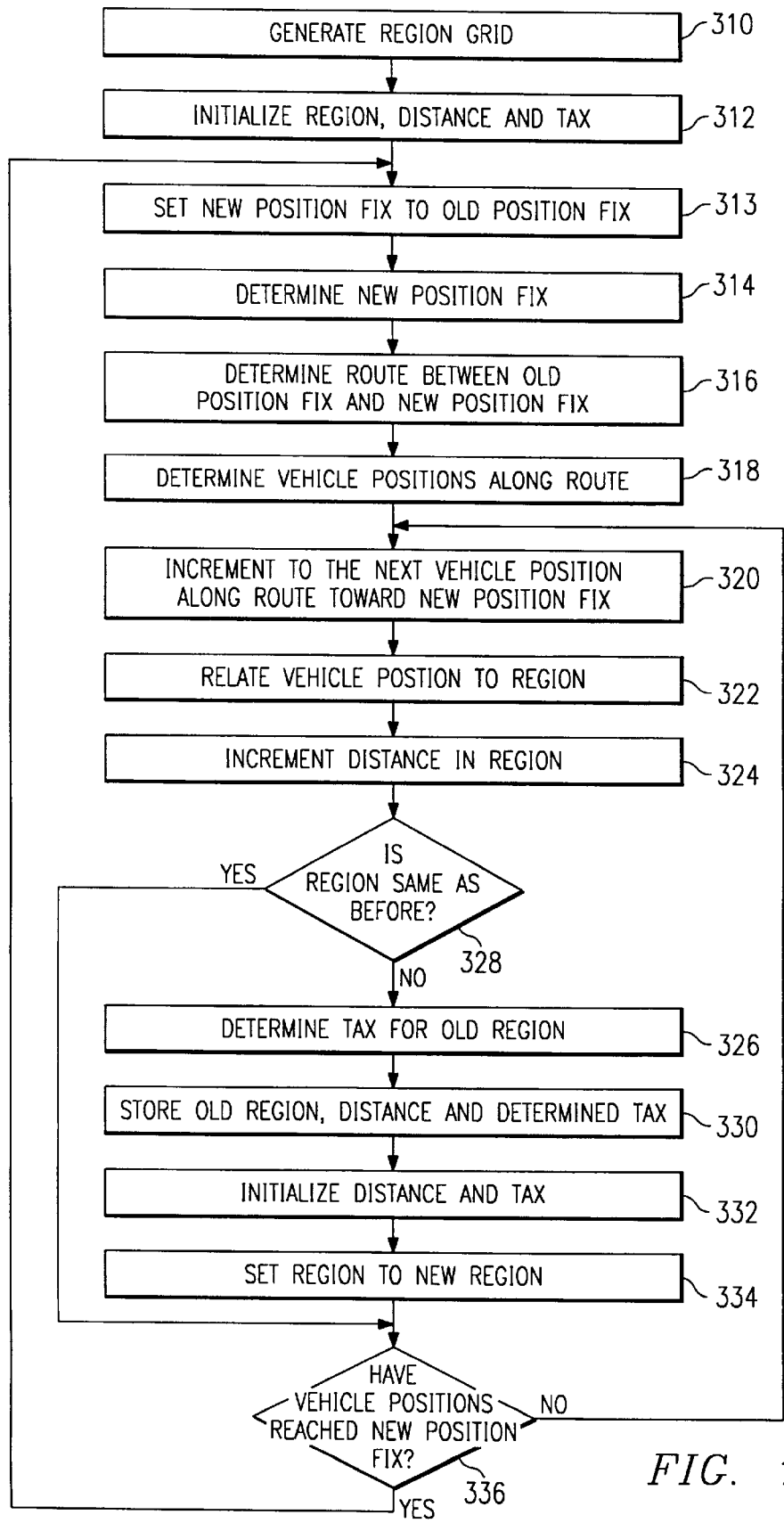
FIG. 12 is an alternative flow chart of the first method for determining tax of a vehicle, using the grid shown in FIGS. 2 and 3.

FIG. 12 is a flow chart of an alternative method for determining tax using region grid 60 shown in FIGS. 2 and 3. This method segments each leg of the route defined by position fixes into numerous vehicle positions. Again, this method may be performed by mobile unit 22, dispatch 30, or a combination of mobile unit 22 and dispatch 30. The segmentation of position fixes into numerous vehicle positions may be performed after mobile unit 22 has collected a number of position fixes. Therefore, the method described with reference to FIG. 12 may be more effectively performed at dispatch 30 or host 35, where more processing capability and data storage is available. However, to promote clarity in description among the different methods, the following explanation assumes that all steps are performed by mobile unit 22 on vehicle 20.

Initially, processor 100 of mobile unit 22 generates region grid 60 (at 310) comprising a plurality of cells, each cell associated with a taxing region. Processor 100 initializes the region, the distance traveled by vehicle 20 in the region, and the tax for the region (at 312). Processor 100 sets a new position fix to an old position fix (at 313).

Receiver 84 of mobile positioning receiver 80 processes positioning information received from satellites 52, and controller 86 determines a new position fix (at 314). Alternatively, an on-board positioning sensor establishes a new position fix. Processor 100 receives the new position fix from either mobile positioning receiver 80 or the on-board positioning sensor. Based upon this information and other information that may be contained within memory 102, processor 100 determines a route between the old position fix and the new position fix (at 316). Processor 100 specifies a sequence of vehicle positions along the route (at 318). These vehicle positions can be spaced at equal distances along the route.

Processor 100 increments to the next vehicle position along the route toward the new position fix (at 320). Based upon the information contained in region grid 60, processor 100 relates the vehicle position to a taxing region (at 322). Processor 100 then increments distance (at 324) within the current region. The step of incrementing the distance may be performed using vehicle positions or by reading mileage from odometer 109.

Processor 100 next determines (at 328) whether the region is the same as before. If the region is not the same, processor 100 determines the tax for the old region (at 326) and stores the old region, the distance traveled by vehicle 20 in that region, and the determined tax for that region (at 330). Processor 100 initializes the distance and tax (at 332) and sets the region to the new region (at 334). Processor 100 determines (at 336) whether the vehicle positions have reached the new position fix.

If the region is the same as before, processor 100 skips the steps of storing (330), initializing (332), and setting (334) and determines (at 336) whether the vehicle positions have reached the new position fix. If the vehicle positions have reached the new position fix, mobile unit 22 returns to the step of determining a new position fix. If the vehicle positions have not reached the new position fix, mobile unit 22 returns to the step of incrementing vehicle positions along the route toward the new position fix.

Figure 13:
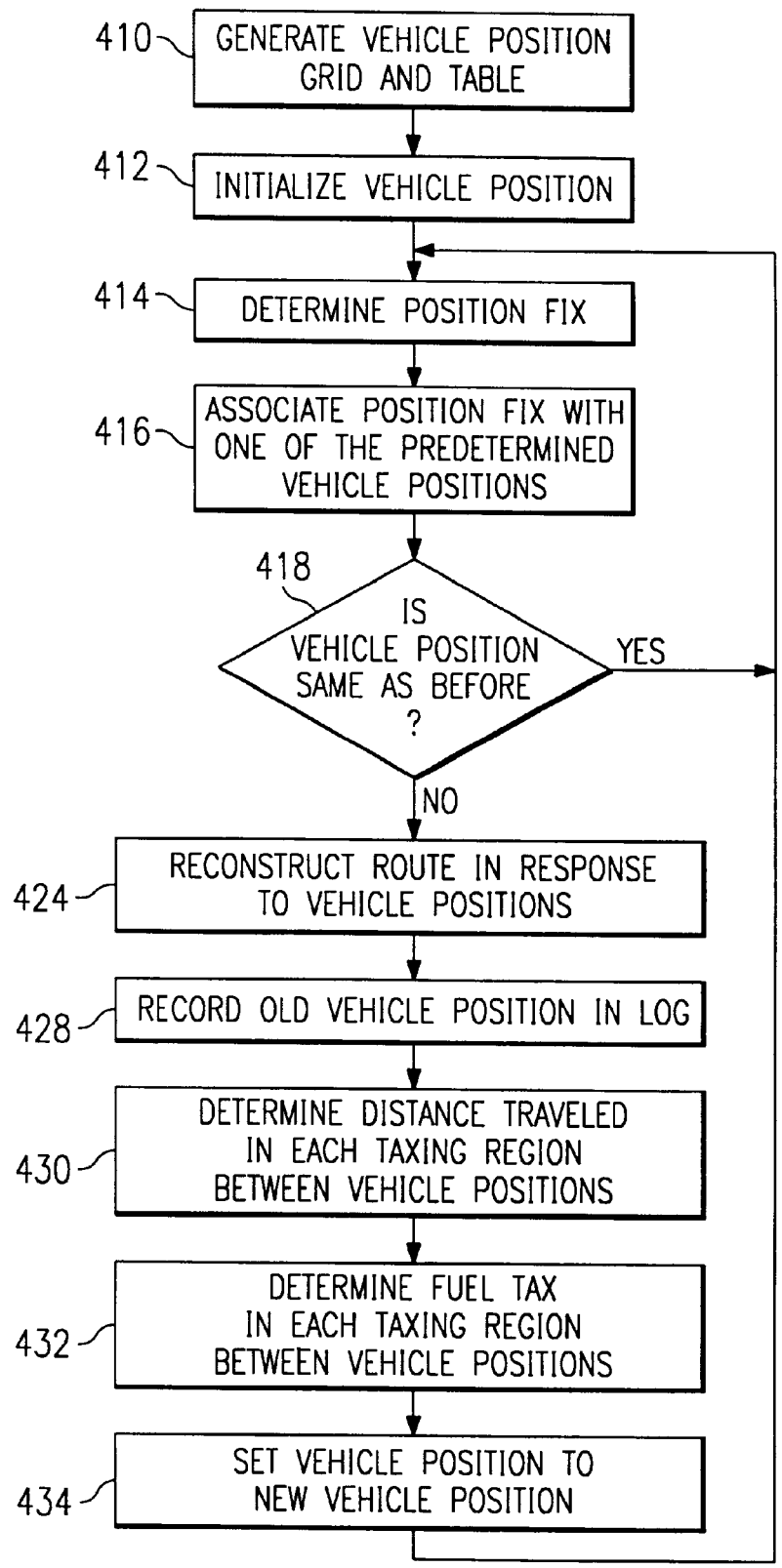
FIG. 13 is a flow chart of the second method for determining tax of a vehicle, using the grid shown in FIGS. 4 and 5.

FIG. 13 is a flow chart of a method for determining tax for vehicle 20 using vehicle position grid 65 shown in FIGS. 4 and 5. The following explanation of the method illustrated in FIG. 13 assumes that all steps are performed on vehicle 20.

Initially, processor 100 at mobile unit 22 generates vehicle position grid 65 and table 70 (at 410). Vehicle position grid 65 comprises a plurality of cells, each cell associated with a predetermined vehicle position. Several cells may contain the same predetermined vehicle position. Table 70 contains information about the distance and the tax for each region between different predetermined vehicle positions. Processor 100 then initializes the vehicle position (at 412).

Receiver 84 of mobile positioning receiver 80 processes positioning information received from satellites 52. Controller 86 determines a position fix (at 414). In the alternative, an on-board positioning sensor establishes a position fix. Processor 100 receives the position fix from either mobile positioning receiver 80 or the on-board position sensor. Based upon the information contained in vehicle position grid 65, processor 100 associates the position fix with one of the predetermined vehicle positions (at 416).

Processor 100 next determines (at 418) whether the vehicle position is the same as before. If the vehicle position is the same as before, mobile unit 22 returns to the step of determining the position fix (at 414). If the vehicle position is not the same as before, processor 100 reconstructs (at 424) a route traveled by vehicle 20 in response to the vehicle positions. Processor 100 records the old vehicle position in memory 102 or output device 104 (at 428). By referencing table 70, processor 100 determines the distance traveled by vehicle 20 in each taxing region between the vehicle positions (at 430). Processor 100 may also augment or, supplement the distance determination by reading mileage from odometer 109. Next, processor 100 determines the tax in each taxing region between vehicle positions by referencing table 70 (at 432). Processor 100 then sets the vehicle position to the new vehicle position (at 434). Mobile unit 22 returns to the step of determining a position fix (at 414).

Figure 14:
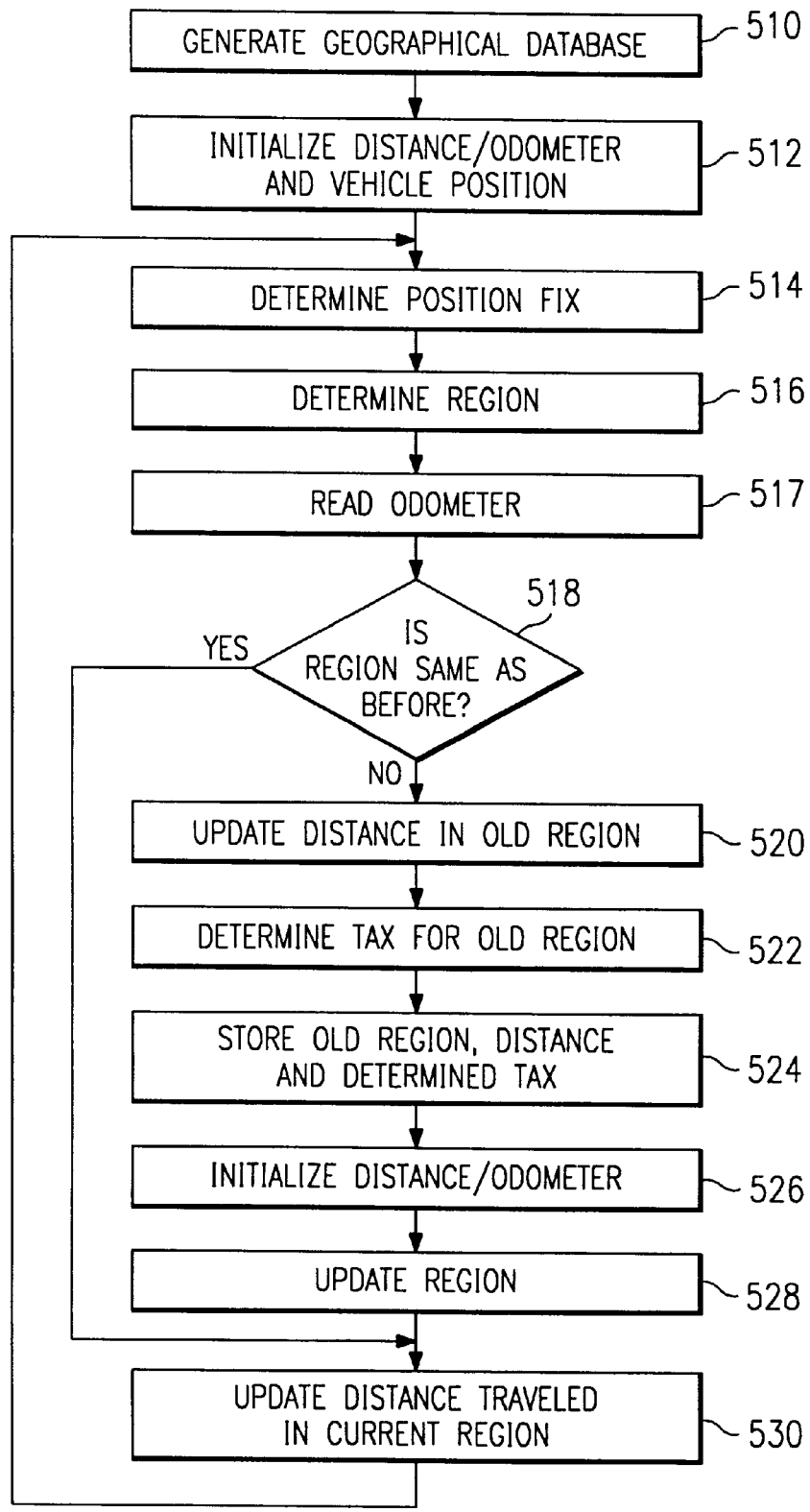
FIG. 14 is a flow chart of the third method for determining tax of a vehicle, as shown in operation using the map of FIGS. 7 and 8.

FIG. 14 is a flow chart for the third method for determining tax of a vehicle as shown in operation using the map illustrated in FIGS. 7 and 8. Initially, processor 100 generates a geographical database (at 510). The geographical database comprises information that allows processor 100 to determine at what point vehicle 20 traveled from one taxing region into another, such as geographical coordinates defining regional boundaries or the intersections of routes with regional boundaries. Processor 100 then initializes the distance by recording the reading on odometer 109, and the vehicle position (at 512).

Receiver 84 of mobile positioning receiver 80 processes positioning information received from satellites 52. Controller 86 determines a position fix (at 514). Alternatively, an on-board positioning sensor establishes a position fix. Processor 100 receives the position fix from either mobile positioning receiver 80 or the on-board positioning sensor. Based upon the position fix and information contained within the geographical database, processor 100 determines the taxing region in which vehicle 20 is located (at 516). Processor 100 reads odometer 109 (at 517) to obtain a measured distance.

Processor 100 determines (at 518) whether the region is the same as before. If the region is not the same, processor 100 updates the distance in the old region (at 520) based upon the distance measured by odometer 109 and the information contained in the geographical database. As discussed above, processor 100 may either credit all the distance to the old region or credit a proportionate amount of the distance to each of the old region and the new region. Processor 100 then determines the tax for the old region (at 522) based upon the distance traveled in the old region. Processor 100 stores the old region, the distance traveled by vehicle 20 in that region, and the determined tax for the region (at 524). Processor 100 initializes the distance (at 526) and updates the region to the new region (at 528). Processor 100 updates the distance traveled in the current region (at 530).

If the region is the same as before, processor 100 skips the steps of updating in the old region (520), determining tax (522), storing (524), initializing (526), and updating the region (528). Processor 100 then updates the distance traveled in the current region using the distance measured by odometer 109, the position fix, and the information contained in the geographical database (at 530).

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for determining a tax for a vehicle, comprising:
   a mobile unit coupled to a vehicle, the mobile unit comprising:
      a positioning device operable to determine a plurality of position fixes along a route traveled by the vehicle;
      an odometer operable to generate a plurality of odometer readings; and
      a communications device operable to initiate transmission of the position fixes and the odometer readings based on a configurable condition;
   a communications link coupled to the mobile unit, the communications link operable to receive the position fixes and the odometer readings from the mobile unit; and
   a remote location coupled to the communications link, the remote location operable to receive the position fixes and the odometer readings determined by the mobile unit using the communications link, the remote location further operable to determine a tax for the vehicle in a plurality of taxing regions in response to the position fixes and the odometer readings.

2. The system of claim 1, wherein the communications link comprises a cellular telephone network.

3. The system of claim 1, wherein the positioning device comprises a GPS receiver to determine the position fixes.

4. The system of claim 1, wherein the remote location comprises:
   a memory operable to store geographical information that specifies a plurality of taxing regions; and
   a processor coupled to the memory and operable to associate each position fix to a corresponding taxing region, the processor further operable to determine distance traveled in the corresponding taxing region using the odometer readings.

5. The system of claim 4, wherein the processor is further operable to determine the mileage traveled by the vehicle using a first odometer reading associated with the first position fix and a second odometer reading associated with the second position fix.

6. The system of claim 4, wherein the processor is further operable to credit a proportionate amount of a mileage traveled by the vehicle to a first taxing region associated with a first position fix and a second taxing region associated with a successive second position fix.

7. The system of claim 6, wherein the processor credits the proportionate amount of the mileage using the first and second position fixes and the stored geographical information.

8. An apparatus on a vehicle for transmitting information to a remote location for purposes of tax determination, comprising:
   a positioning device operable to determine a plurality of position fixes along a route traveled by a vehicle;
   an odometer operable to generate a plurality of odometer readings; and a transmitter coupled to the positioning device and the odometer, the transmitter operable to initiate transmission of the position fixes and the odometer readings to the remote location based on a configurable condition for purposes of tax determination.

9. The apparatus of claim 8, wherein the transmitter comprises a cellular telephone.

10. The apparatus of claim 8, wherein the positioning device comprises a GPS receiver.

11. The apparatus of claim 8, further comprising a processor operable to compile a report containing the position fixes and the odometer readings.

12. The apparatus of claim 11, wherein the report includes position fixes and odometer readings accumulated over a predetermined reporting interval specified by the configurable condition.

13. The apparatus of claim 8, wherein each position fix is associated with a corresponding odometer reading.

14. A method for determining distances traveled by a vehicle in a plurality of taxing regions, comprising:
   determining a plurality of position fixes for a vehicle;
   determining a plurality of odometer readings for the vehicle;
   initiating transmission of the position fixes and the odometer readings based on a configurable condition;
   receiving the position fixes and odometer readings at a remote location;
   storing geographic information at the remote location specifying a plurality of taxing regions;
   associating at the remote location each position fix with one of the taxing regions; and
   determining at the remote location a distance traveled by the vehicle in each taxing region using the odometer readings.

15. The method of claim 14, further comprising determining a tax in each region using the determined distance.

16. The method of claim 14, wherein the step of determining a plurality of position fixes is performed by a GPS receiver on the vehicle.

17. The method of claim 14, wherein the remote location receives the position fixes and odometer readings using a cellular telephone network.

18. The method of claim 14, wherein the step of determining the distance further comprises:
   identifying a first position fix in a first taxing region and a successive second position fix in a second taxing region; and
   crediting a proportionate amount of a mileage traveled by the vehicle to the first and second taxing regions.

19. The method of claim 18, further comprising the step of determining the mileage traveled by the vehicle using a first odometer reading associated with the first position fix and a second odometer reading associated with the second position fix.

20. The method of claim 18, wherein the step of crediting a proportionate amount of a mileage is performed using the first and second position fixes and the stored geographical information.

21. A method of determining distances traveled by a vehicle in a plurality of taxing regions, comprising:
   storing geographic information specifying a plurality of taxing regions;
   determining a first position fix and a successive second position fix;
   determining a mileage between the first and second position fixes;
   associating the first position fix with a first taxing region and the second position fix with a second taxing region; and
   determining a proportionate amount of the mileage traveled in the first and second taxing regions.

22. The method of claim 21, wherein the step of determining a proportionate amount of the mileage is performed using the first and second position fixes and the stored geographical information.

23. The method of claim 21, further comprising determining a tax in each of the first and second taxing regions using the determined amount of the mileage traveled.

24. The method of claim 21, wherein determining a mileage comprises:
   receiving a first odometer reading associated with the first position fix;
   receiving a second odometer reading associated with the second position fix; and
   subtracting the first odometer reading from the second odometer reading to determine the mileage.

25. The method of claim 21, wherein at least the steps of associating and determining a proportionate amount of the mileage traveled are performed at a location remote from the vehicle.

26. The method of claim 21, wherein all steps are performed on the vehicle.

27. The method of claim 21, wherein the step of determining the first and second position fixes is performed by a GPS receiver on the vehicle.

28. An apparatus on a vehicle for determining distances traveled by the vehicle in a plurality of taxing regions, comprising:
   a positioning device operable to determine a first position fix and a second position fix along a route traveled by the vehicle;
   a memory operable to store geographic information specifying a plurality of taxing regions; and
   a processor coupled to the positioning device and the memory, the processor operable to receive the first position fix and the second position fix from the positioning device, the processor further operable to associate the first position fix with a first taxing region and the second position fix with a second taxing region, the processor further operable to proportion a mileage traveled between the first and second position fixes to the first and second taxing regions.

29. The apparatus of claim 28, wherein the processor is further operable to determine a tax for the vehicle in the first and second taxing regions using the proportioned mileage traveled between the first and second position fixes.

30. The apparatus of claim 28, further comprising an odometer to determine the mileage traveled between the first and second position fixes.

31. The apparatus of claim 28, wherein the positioning device comprises a GPS positioning receiver.

32. The apparatus of claim 28, wherein the geographic information specifies boundaries of a plurality of states.

33. The apparatus of claim 28, wherein the processor proportions a mileage traveled between the first and second position fixes using the stored geographic information and the first and second position fixes.

34. The apparatus of claim 28, further comprising a transmitter coupled to the processor and operable to communicate the proportioned mileage to a remote location.

35. An apparatus remotely located from a vehicle for determining distances traveled by the vehicle in a plurality of taxing regions, comprising:

a communications device coupled to a communications link and operable to receive a plurality of position fixes and a plurality of odometer readings for a vehicle;

a memory operable to store geographical information that specifies a plurality of taxing regions; and a central controller coupled to the communications device and the memory, the central controller operable to associate each position fix to a corresponding taxing region, the central controller further operable to determine distance traveled in the corresponding taxing regions using the odometer readings, the central controller further operable to determine a proportionate amount of a mileage traveled by the vehicle in a first region associated with a first position fix and a second region associated with a second position fix.

36. The apparatus of claim 35, wherein the communications link comprises a cellular telephone network.

37. The apparatus of claim 35, wherein the communications device receives a compiled report representing position fixes and odometer readings accumulated over a predetermined reporting interval.

38. The apparatus of claim 35, wherein each position fix is associated with a corresponding odometer reading.

39. The apparatus of claim 35, wherein the geographical information specifies boundaries of a plurality of states.

40. The apparatus of claim 35, wherein the central controller uses the first and second position fixes and the stored geographical information to determine the proportionate amount of the mileage.

41. The apparatus of claim 35, wherein the mileage traveled by the vehicle comprises the difference between a first odometer reading associated with the first position fix and a second odometer reading associated with the second position fix.

* * * * *

(12) EX PARTE REEXAMINATION CERTIFICATE (9122nd)
United States Patent
Westerlage et al.

(10) Number: US 5,970,481 C1
(45) Certificate Issued: *Jul. 10, 2012

(54) METHOD AND APPARATUS FOR DETERMINING TAX OF A VEHICLE

(75) Inventors: Kenneth R. Westerlage, Fort Worth, TX (US); William C. Kennedy, III, Dallas, TX (US); William L. Hoag, Farmers Branch, TX (US)

(73) Assignees: Pittco Capital Partners II, L.P., Memphis, TN (US); Jackson Capital Partners, L.P., Jackson, WY (US); Michael S. Starnes, Memphis, TN (US)

Reexamination Request:
No. 90/010,865, Feb. 16, 2010

Reexamination Certificate for:
Patent No.: 5,970,481
Issued: Oct. 19, 1999
Appl. No.: 08/976,294
Filed: Nov. 21, 1997

(*) Notice: This patent is subject to a terminal disclaimer.

Related U.S. Application Data

(63) Continuation of application No. 08/437,404, filed on May 9, 1995, now Pat. No. 5,694,322.

(51) Int. Cl.
*G06F 17/00* (2006.01)

(52) U.S. Cl. .......................................... 705/417; 705/31
(58) Field of Classification Search .................. None
See application file for complete search history.

(56) References Cited

To view the complete listing of prior art documents cited during the proceeding for Reexamination Control Number 90/010,865, please refer to the USPTO's public Patent Application Information Retrieval (PAIR) system under the Display References tab.

*Primary Examiner* — Cameron Saadat

(57) ABSTRACT

An apparatus for determining a tax for a vehicle (20) includes a positioning device (80) operable to determine a plurality of vehicle positions along a route traveled by the vehicle (20). A memory (102) stores geographic information defining a plurality of taxing regions through which the route of the vehicle (20) passes. An odometer (109) measures the distance traveled by the vehicle (20). A processor (100) is coupled to the positioning device (80), the memory 102), and the odometer (109). The processor (100) receives vehicle positions from the positioning device (80), geographical information from the memory (102), and optionally the measured distance from the odometer (109). The processor (100) determines the tax for the vehicle (20) in at least one taxing region through which the route of the vehicle (20) passes in response to the vehicle positons, the geographic information, and the measured distance.

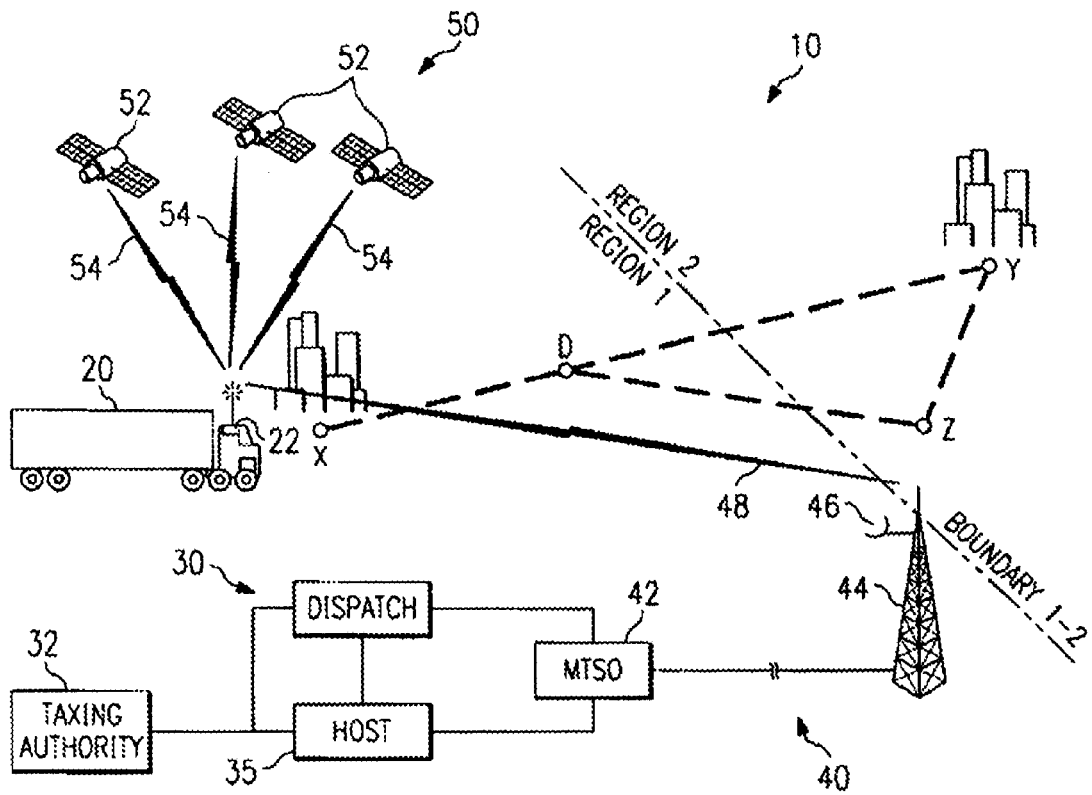

US 5,970,481 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-41 is confirmed.

New claims 42-112 are added and determined to be patentable.

*42. The system of claim 1 wherein the position fixes comprise latitude and longitude coordinates.*

*43. The system of claim 1 wherein the positioning device is configured to make determinations of position fixes at a time interval.*

*44. The system of claim 43 wherein the time interval is configurable by a dispatch.*

*45. The system of claim 1 wherein the configurable condition is a reporting interval.*

*46. The system of claim 1 wherein the configurable condition is a full memory buffer.*

*47. The system of claim 1 wherein the configurable condition is a store and forward routine.*

*48. The system of claim 1 wherein the configurable condition is a minimum signal strength received from the communications link.*

*49. The system of claim 1 wherein the configurable condition is a determination that the vehicle has passed a significant geographic point.*

*50. The system of claim 1 wherein the configurable condition is an elapsed time.*

*51. The system of claim 1 wherein the configurable condition is a predetermined time.*

*52. The system of claim 1 wherein the configurable condition is movement of the mobile unit.*

*53. The system of claim 1 wherein, to determine the tax for the vehicle in a plurality of taxing regions in response to the position fixes and the odometer readings, the remote location is further operable to relate at least two position fixes to a first one of the plurality of taxing regions and determine a distance traveled by the vehicle in the first taxing region using received odometer readings associated with the at least two position fixes.*

*54. The system of claim 53 wherein, to relate at least two position fixes to the first taxing region, the remote location is further operable to relate the at least two position fixes to the first taxing region using geographic information that defines boundaries of the plurality of taxing regions.*

*55. The system of claim 54 wherein the geographic information includes coordinates defining the boundaries.*

*56. The system of claim 1 wherein, to determine the tax for the vehicle in a plurality of taxing regions in response to the position fixes and the odometer readings, the remote location is further operable to relate a first one of the position fixes to a first one of the taxing regions, relate a second one of the plurality of position fixes to a second one of the taxing regions, determine a mileage traveled between the first and second fixes, and proportion the mileage between the first and second taxing regions.*

*57. The system of claim 1 wherein, to determine a tax for the vehicle in a plurality of taxing regions in response to the position fixes and the odometer readings, the remote location is further operable to associate the position fixes with predetermined vehicle positions and determine the tax for the vehicle in the plurality of taxing regions using the predetermined vehicle positions and odometer readings.*

*58. The system of claim 57 wherein, to associate the position fixes with predetermined vehicle positions, the remote location is further operable to associate a first set of multiple position fixes with a first, single predetermined vehicle position and associate a second set of multiple position fixes with a second, single predetermined vehicle position, where the first and second predetermined vehicle positions are distinct.*

*59. The system of claim 58 wherein the first set of multiple position fixes and the second set of multiple position fixes each include successively determined position fixes.*

*60. The system of claim 58 wherein, to determine the tax for the vehicle in the plurality of taxing regions using the predetermined vehicle positions and odometer readings, the remote location is further operable to determine a distance between the first, single predetermined vehicle position and the second, single predetermined vehicle position.*

*61. The system of claim 60 wherein, to determine a distance between the first, single predetermined vehicle position and the second, single predetermined vehicle position, the remote location is further operable to reference a table that includes tax amounts for distances traveled between predetermined vehicle positions.*

*62. The system of claim 60 wherein, to determine the tax for the vehicle in the plurality of taxing regions using the predetermined vehicle positions and odometer readings, the remote location is further operable to determine an amount of tax owed for the determined distance between the first, single predetermined vehicle position and the second, single predetermined vehicle position.*

*63. The system of claim 60 wherein the determined distance between the first, single predetermined vehicle position and the second, single predetermined vehicle position comprises highway mileage between the first, single predetermined vehicle position and the second, single predetermined vehicle position.*

*64. The system of claim 60 wherein, to determine the tax for the vehicle in the plurality of taxing regions using the predetermined vehicle positions and odometer readings, the remote location is further operable to determine a first proportion of the determined distance that is in a first taxing region and second proportion of the determined distance that is in a second taxing region.*

*65. The system of claim 64 wherein, to determine the tax for the vehicle in the plurality of taxing regions using the predetermined vehicle positions and odometer readings, the remote location is further operable to determine a first tax corresponding to the first proportion of the determined distance and a second tax corresponding to the second proportion of the determined distance.*

*66. The system of claim 57 wherein, to determine the tax for the vehicle in the plurality of taxing regions using the predetermined vehicle positions and odometer readings, the remote location is further operable to determine an amount of tax owed for travel by the vehicle between the first, single predetermined vehicle position and the second, single predetermined vehicle position.*

67. The system of claim 66 wherein, to determine an amount of tax owed for travel by the vehicle between the first, single predetermined vehicle position and the second, single predetermined vehicle position, the remote location is further operable to reference a table that includes tax amounts for distances traveled between predetermined vehicle positions.

68. The system of claim 57 wherein at least one of the predetermined vehicle positions is a city.

69. The system of claim 57 wherein at least one of the predetermined vehicle positions is a town.

70. The system of claim 57 wherein at least one of the predetermined vehicle positions is a boundary between taxing regions.

71. The system of claim 57 wherein at least one of the predetermined vehicle positions is an intersection of major highways.

72. The system of claim 8 wherein the positioning device is configured to make determinations of position fixes at a time interval.

73. The system of claim 72 wherein the time interval is configurable by a dispatch.

74. The system of claim 8 wherein the configurable condition is a reporting interval.

75. The system of claim 8 wherein the configurable condition is a full memory buffer.

76. The system of claim 8 wherein the configurable condition is a store and forward routine.

77. The system of claim 8 wherein the configurable condition is a minimum signal strength received from the communications link.

78. The system of claim 8 wherein the configurable condition is a determination that the vehicle has passed a significant geographic point.

79. The system of claim 8 wherein the configurable condition is an elapsed time.

80. The system of claim 8 wherein the configurable condition is a predetermined time.

81. The system of claim 8 wherein the configurable condition is movement of the mobile unit.

82. The method of claim 14 wherein initiating transmission of the position fixes and the odometer readings based on a configurable condition comprises initiating transmission of the position fixes and the odometer readings based on a configurable condition at the vehicle.

83. The method of claim 14 wherein the position fixes latitude and longitude coordinates.

84. The method of claim 14 wherein determining a plurality of position fixes for a vehicle comprises determining of position fixes at a time interval.

85. The method of claim 84 wherein the time interval is configurable by a dispatch.

86. The method of claim 14 wherein the configurable condition is a reporting interval.

87. The method of claim 14 wherein the configurable condition is a full memory buffer.

88. The method of claim 14 wherein the configurable condition is a store and forward routine.

89. The method of claim 14 wherein the configurable condition is a minimum signal strength received from the communications link.

90. The method of claim 14 wherein the configurable condition is a determination that the vehicle has passed a significant geographic point.

91. The method of claim 14 wherein the configurable condition is an elapsed time.

92. The method of claim 14 wherein the configurable condition is a predetermined time.

93. The method of claim 14 wherein the configurable condition is movement of the mobile unit.

94. The method of claim 14 wherein:

associating at the remote location each position fix with one of the taxing regions comprises relating at least two of the position fixes to a first one of the plurality of taxing regions; and determining at the remote location a distance traveled by the vehicle in each taxing region using the odometer readings comprises determining a distance traveled by the vehicle in the first taxing region using received odometer readings associated with the at least two position fixes.

95. The method of claim 94 wherein relating at least two of the position fixes to a first one of the plurality of taxing regions comprises relating the at least two position fixes to the first taxing region using the geographic information.

96. The method of claim 95 wherein the geographic information includes coordinates defining the taxing regions.

97. The method of claim 14 wherein determining at the remote location a distance traveled by the vehicle in each taxing region using the odometer readings comprises relating a first one of the position fixes to a first one of the taxing regions, relating a second one of the plurality of position fixes to a second one of the taxing regions, determining a mileage traveled between the first and second position fixes, proportioning the mileage between the first and second taxing regions.

98. The method of claim 14 wherein determining at the remote location a distance traveled by the vehicle in each taxing region using the odometer readings comprises associating the position fixes with predetermined vehicle positions and determining a distance traveled by the vehicle in each taxing region using the predetermined vehicle positions and odometer readings.

99. The method of claim 98 wherein associating the position fixes with predetermined vehicle positions comprises associating a first set of multiple position fixes with a first, single predetermined vehicle position and associating a second set of multiple position fixes with a second, single predetermined vehicle position, where the first and second predetermined vehicle positions are distinct.

100. The method of claim 99 wherein the first set of multiple position fixes and the second set of multiple position fixes each include successively determined position fixes.

101. The method of claim 99 wherein determining a distance traveled by the vehicle in each taxing region using the predetermined vehicle positions and odometer readings comprises determining a distance between the first, single predetermined vehicle position and the second, single predetermined vehicle position.

102. The method of claim 101 wherein determining a distance traveled by the vehicle in each taxing region using the predetermined vehicle positions and odometer readings comprises referencing a table that includes tax amounts for distances traveled between predetermined vehicle positions.

103. The method of claim 101 further comprising determining an amount of tax owed for the determined distance between the first, single predetermined vehicle position and the second, single predetermined vehicle position.

104. The method of claim 101 wherein the determined distance between the first, single predetermined vehicle position and the second, single predetermined vehicle position comprises highway mileage between the first, single predetermined vehicle position and the second, single predetermined vehicle position.

105. The method of claim 101 further comprising determining a first proportion of the determined distance between the first, single predetermined vehicle position and the second, single predetermined vehicle position that is in a first taxing region and a second proportion of the determined distance between the first, single predetermined vehicle position and the second, single predetermined vehicle position that is in a second taxing region.

106. The method of claim 105 further comprising determining a first tax corresponding to the first proportion and a second tax corresponding to the second proportion.

107. The method of claim 98 wherein at least one of the predetermined vehicle positions is a city.

108. The method of claim 98 wherein at least one of the predetermined vehicle positions is a town.

109. The method of claim 98 wherein at least one of the predetermined vehicle positions is a boundary between taxing regions.

110. The method of claim 98 wherein at least one of the predetermined vehicle positions is an intersection of major highways.

111. The system of claim 28 wherein the processor is further operable to determine the mileage traveled between the first and second position fixes using odometer readings associated with the first and second position fixes.

112. The system of claim 35 wherein the central controller is further operable to determine a mileage between a first position fix and a second position fix and to determine a proportionate amount of a mileage traveled by the vehicle in a first region associated with a first position fix and a second region associated with a second position fix, the central controller is further operable to determine a proportionate amount of the determined mileage that was traveled by the vehicle in the first and second regions.

\* \* \* \* \*

(12) EX PARTE REEXAMINATION CERTIFICATE (10013th)

United States Patent
Westerlage et al.

(10) Number: US 5,970,481 C2
(45) Certificate Issued: *Jan. 15, 2014

(54) METHOD AND APPARATUS FOR DETERMINING TAX OF A VEHICLE

(75) Inventors: Kenneth R. Westerlage, Fort Worth, TX (US); William C. Kennedy, III, Dallas, TX (US); William L. Hoag, Farmers Branch, TX (US)

(73) Assignees: Pittco Capital Partners II, L.P., Memphis, TN (US); Jackson Capital Partners, L.P., Jackson, WY (US); Michael S. Starnes, Memphis, TN (US)

Reexamination Request:
No. 90/012,414, Aug. 1, 2012

Reexamination Certificate for:
Patent No.: 5,970,481
Issued: Oct. 19, 1999
Appl. No.: 08/976,294
Filed: Nov. 21, 1997

Reexamination Certificate C1 5,970,481 issued Jul. 10, 2012

( * ) Notice: This patent is subject to a terminal disclaimer.

Related U.S. Application Data

(63) Continuation of application No. 08/437,404, filed on May 9, 1995, now Pat. No. 5,694,322.

(51) Int. Cl.
*G06F 17/00* (2006.01)
*G06Q 30/02* (2012.01)

(52) U.S. Cl.
CPC .................................. *G06Q 30/0284* (2013.01)
USPC .............................................. 705/417; 705/31

(58) Field of Classification Search
None
See application file for complete search history.

(56) References Cited

To view the complete listing of prior art documents cited during the proceeding for Reexamination Control Number 90/012,414, please refer to the USPTO's public Patent Application Information Retrieval (PAIR) system under the Display References tab.

*Primary Examiner* — Dennis Bonshock

(57) ABSTRACT

An apparatus for determining a tax for a vehicle (20) includes a positioning device (80) operable to determine a plurality of vehicle positions along a route traveled by the vehicle (20). A memory (102) stores geographic information defining a plurality of taxing regions through which the route of the vehicle (20) passes. An odometer (109) measures the distance traveled by the vehicle (20). A processor (100) is coupled to the positioning device (80), the memory 102), and the odometer (109). The processor (100) receives vehicle positions from the positioning device (80), geographical information from the memory (102), and optionally the measured distance from the odometer (109). The processor (100) determines the tax for the vehicle (20) in at least one taxing region through which the route of the vehicle (20) passes in response to the vehicle positons, the geographic information, and the measured distance.

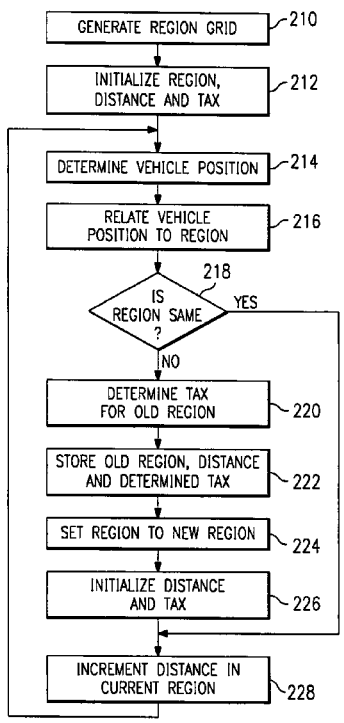

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 12, 21-41, 45-52, 74-82, 86-93, 111 and 112 are cancelled.

Claims 1, 8 and 14 are determined to be patentable as amended.

Claims 2-7, 9-11, 13, 15-20, 42-44, 53-73, 83-85 and 94-110, dependent on an amended claim, are determined to be patentable.

1. A system for determining a tax for a vehicle, comprising:
   a mobile unit coupled to a vehicle, the mobile unit comprising:
      a positioning device operable to determine a plurality of position fixes along a route traveled by the vehicle;
      an odometer operable to generate a plurality of odometer readings; and
      a communications device operable to initiate transmission of the position fixes and the odometer readings based on a configurable condition;
   a communications link coupled to the mobile unit, the communications link operable to receive the position fixes and the odometer readings from the mobile unit; and
   a remote location coupled to the communications link, the remote location operable to receive the position fixes and the odometer readings determined by the mobile unit using the communications link, the remote location further operable to determine a tax for the vehicle in a plurality of taxing regions in response to the position fixes and the odometer readings;
   *wherein the configurable condition is a determination that the vehicle has passed a significant geographic point.*

8. An apparatus on a vehicle for transmitting information to a remote location for purposes of tax determination, comprising:
   a positioning device operable to determine a plurality of position fixes along a route traveled by a vehicle;
   an odometer operable to generate a plurality of odometer readings; and
   a transmitter coupled to the positioning device and the odometer, the transmitter operable to initiate transmission of the position fixes and the odometer readings to the remote location based on a configurable condition for purposes of tax determination;
   *wherein the configurable condition is a determination that the vehicle has passed a significant geographic point.*

14. A method for determining distances traveled by a vehicle in a plurality of taxing regions, comprising:
   determining a plurality of position fixes for a vehicle;
   determining a plurality of odometer readings for the vehicle;
   initiating transmission of the position fixes and the odometer readings based on a configurable condition;
   receiving the position fixes and odometer readings at a remote location;
   storing geographic information at the remote location specifying a plurality of taxing regions;
   associating at the remote location each position fix with one of the taxing regions; and
   determining at the remote location a distance traveled by the vehicle in each taxing region using the odometer readings;
   *wherein the configurable condition is a determination that the vehicle has passed a significant geographic point.*

* * * * *